(12) United States Patent
Berns et al.

(10) Patent No.: US 12,385,182 B2
(45) Date of Patent: Aug. 12, 2025

(54) METHOD AND APPARATUS FOR DYEING GARMENTS

(71) Applicant: Ralph Lauren Corporation, New York, NY (US)

(72) Inventors: Jason Andrew Berns, Montclair, NJ (US); Richard Paul Tinsley, Stamford, CT (US)

(73) Assignee: RALPH LAUREN CORPORATION, New York, NY (US)

( * ) Notice: Subject to any disclaimer, the term of this patent is extended or adjusted under 35 U.S.C. 154(b) by 0 days.

(21) Appl. No.: 18/662,807

(22) Filed: May 13, 2024

(65) Prior Publication Data
US 2024/0295072 A1 Sep. 5, 2024

Related U.S. Application Data

(63) Continuation of application No. 18/344,449, filed on Jun. 29, 2023, now Pat. No. 12,031,268, which is a
(Continued)

(51) Int. Cl.
*D06P 1/00* (2006.01)
*D06B 23/24* (2006.01)
(Continued)

(52) U.S. Cl.
CPC ............ *D06P 1/0008* (2013.01); *D06B 23/24* (2013.01); *G05B 15/02* (2013.01); *A41D 27/00* (2013.01)

(58) Field of Classification Search
CPC .................................................. D06P 1/0008
See application file for complete search history.

(56) References Cited

U.S. PATENT DOCUMENTS 3,927,971 A 12/1975 Meier-Windhorst
4,165,288 A 8/1979 Teed et al.
(Continued)

FOREIGN PATENT DOCUMENTS

CN 104611948 A 5/2015
CN 106012592 A 10/2016
(Continued)

OTHER PUBLICATIONS

Jiping Wang et al., "Dyeing Property and Adsorption Kinetics of Reactive Dyes for Cotton Textiles in Salt-Free Non-Aqueous Dyeing Systems," Polymers, vol. 10, No. 9, pp. 1-16, DOI: 10.3390/polym 10091030, (Sep. 15, 2018).
(Continued)

*Primary Examiner* — Jason Y Ko
(74) *Attorney, Agent, or Firm* — ALSTON & BIRD LLP

(57) ABSTRACT

Described herein are apparatuses and methods for dyeing garments. An exemplary apparatus comprises a dye injection system configured to dispense concentrated liquid dye; a dyeing machine comprising a dyeing chamber configured for dyeing at least one garment in a dyebath; and a controller in communication with the dye injection system and the dyeing machine, wherein the controller is configured: to receive at least one garment parameter corresponding to the at least one garment; based at least in part on the at least one received garment parameter, cause the dye injection system to dispense a volume of concentrated liquid dye containing an amount of dyestuff that can be substantially absorbed by the at least one garment; and cause the dyeing machine to execute a dye cycle such that substantially all of the dyestuff in the dispensed concentrated liquid dye is absorbed by the at least one garment within the dyeing chamber.

18 Claims, 10 Drawing Sheets
(2 of 10 Drawing Sheet(s) Filed in Color)

Related U.S. Application Data continuation of application No. 16/855,838, filed on Apr. 22, 2020, now Pat. No. 11,732,408.

(60) Provisional application No. 62/925,078, filed on Oct. 23, 2019, provisional application No. 62/837,165, filed on Apr. 22, 2019.

(51) Int. Cl.
  *G05B 15/02* (2006.01)
  *A41D 27/00* (2006.01)

(56) References Cited

U.S. PATENT DOCUMENTS

| | | |
|---|---|---|
| 4,648,250 A | 3/1987 | Yabe |
| 7,211,293 B2 | 5/2007 | Piana et al. |
| 7,736,696 B2 | 6/2010 | Piana et al. |
| 7,788,754 B2 | 9/2010 | Piana et al. |
| 7,848,841 B2 | 12/2010 | Piana et al. |
| 8,295,970 B2 | 10/2012 | Piana et al. |
| 9,334,597 B1 | 5/2016 | Lim et al. |
| 10,309,048 B2 | 6/2019 | Lim et al. |
| 2012/0266388 A1 | 10/2012 | Pollett et al. |
| 2017/0136761 A1 | 5/2017 | Sieradzki et al. |

FOREIGN PATENT DOCUMENTS

| | | |
|---|---|---|
| EP | 1233098 A1 | 8/2002 |
| GB | 2188906 A | 10/1987 |
| GB | 2324541 A | 10/1998 |
| JP | 1-250462 A | 10/1989 |
| JP | H06207383 A | 7/1994 |
| JP | H06212577 A | 8/1994 |
| JP | 2005273108 A | 10/2005 |
| WO | WO 2008/115685 A1 | 8/2008 |

OTHER PUBLICATIONS

M.N. Islam et al., "Studies on the Dyeing Properties of Fabrics from Sulphonated Jute Fibres with Other Fibres," Pakistan Journal of Biological Sciences, vol. 9, No. 7, pp. 1219-1224, ISSN: 1028-8880, (2006).

Sanjit Acharya et al., "Chemical Cationization of Cotton Fabric for Improved Dye Uptake," Cellulose, 16 pages, ISSN: 0969-0239, DOI: 10.1007/s10570-014-0457-2, (Sep. 27, 2014).

Examination Report under section 18(3) received for United Kingdom Application No. 2115959.5, mailed on Oct. 17, 2022, 2 pages.

International Preliminary Report on Patentability received for International Application No. PCT/IB2020/054749, mailed on Nov. 4, 2021, 11 pages.

International Search Report and Written Opinion received for International Application No. PCT/IB2020/054749, mailed on Aug. 26, 2020, 39 pages.

Office Action received for Japanese Patent Application No. 2021-563311, mailed on May 7, 2024, 4 pages.

European Application No. 24163686, Extended European Search Report mailed Jul. 29, 2024.

METHOD AND APPARATUS FOR DYEING GARMENTS

CROSS-REFERENCE TO RELATED APPLICATIONS

This patent application is a continuation of U.S. nonprovisional patent application Ser. No. 18/344,449, filed Jun. 29, 2023, which is a continuation of U.S. nonprovisional patent application Ser. No. 16/855,838, filed Apr. 22, 2020, which claims priority from U.S. provisional Patent Application Ser. No. 62/837,165, filed Apr. 22, 2019, and from U.S. provisional Patent Application Ser. No. 62/925,078, filed Oct. 23, 2019, each of which is incorporated herein by reference in its entirety.

BACKGROUND

In both industrial and commercial applications, known garment dyeing processes are expensive and time-consuming. In particular, existing garment dyeing processes use large quantities of dye, water, salts, and other substances, which must be used and disposed of in order to apply a desired color to a garment. Conventional dyeing processes often require the use of a dye comprising a pre-mixed solution of dyestuff, water, salts, and other elements added to enhance the dye's compatibility with a garment, fabric, or fiber. The pre-mixed solution may be delivered to a dyeing machine, containing water, where a garment absorbs just a portion of dyestuff present in the dyebath, leaving a resultant effluent in the dyeing machine.

Various processes have evolved to include complex, expensive methods of filtering and/or treating the water post-dyeing, but the contaminants that remain in the water prohibit the remaining water from being reusable in a flexible, variable color dyeing process. Indeed, even contemporary dyeing processes are unable to avoid the excessive, inefficient consumption of raw materials.

In an industry driven by the needs of the consumer, adapting to evolving trends or seasonal preferences requires a flexibility and an efficiency that is missing from the existing garment dyeing processes. The large-batch manufacturing processes that currently define the industry are not only wasteful, but they cannot support rapid transitions in customer color preference. Present garment dyeing processes are defined by rigid systems incapable of accommodating variability or customization of, for example, garment colors and/or patterns without sacrificing efficiency, quality, and/or resources. Furthermore, existing garment dyeing processes have long been defined by the inefficient use of excess water, dye, and other wasteful byproducts, requiring significant efforts to control pollution and environmental impact.

Accordingly, a need exists in the art for an agile, flexible method of dyeing garments that can be responsive to the rapid changes in product demand in a financially and environmentally efficient manner.

BRIEF SUMMARY

Various embodiments described herein relate to apparatuses and methods for dyeing garments. Various embodiments are directed to an apparatus for dyeing garments, the apparatus comprising: a dye injection system configured to dispense concentrated liquid dye; a dyeing machine comprising a dyeing chamber configured for dyeing at least one garment in a dyebath, wherein the dyebath comprises concentrated liquid dye received from the dye injection system and a volume of solvent; and a controller in communication with the dye injection system and the dyeing machine, wherein the controller is configured to: receive at least one garment parameter corresponding to the at least one garment; based at least in part on the at least one received garment parameter, cause the dye injection system to dispense a volume of concentrated liquid dye that contains an amount of dyestuff that can be substantially absorbed by the at least one garment; and cause the dyeing machine to execute a dye cycle such that substantially all of the dyestuff in the dispensed volume of concentrated liquid dye is absorbed by the at least one garment within the dyeing chamber.

In various embodiments, the dyebath within the dyeing chamber may be substantially free of Sodium Chloride, Sodium Sulphate, and alkaline content throughout the dye cycle. In various embodiments, the dyeing machine may be configured to execute the dye cycle with the dye bath at substantially ambient room temperature. In various embodiments, the at least one garment parameter may comprise a weight of the at least one garment. In certain embodiments, the apparatus may further comprise a weight sensor. Further, in various embodiments, the controller may be further configured to receive the weight of the at least one garment from the weight sensor. In various embodiments, the dyeing machine may be configured to maintain the volume of solvent within a substantially closed-loop system. In certain embodiments, the apparatus may further comprise at least one holding tank in fluid communication with the dyeing chamber, wherein the at least one holding tank may be configured for holding the volume of solvent in between dyeing cycles.

In various embodiments, the volume of solvent may comprise water. In various embodiments, the concentrated liquid dye may comprise dyestuff and water. In various embodiments, the dye injection system may comprise a plurality of concentrated liquid dye cartridges, each of the plurality of concentrated liquid dye cartridges being configured store a volume of concentrated liquid dye having a unique dye color. In certain embodiments, the plurality of concentrated liquid dye cartridges of the dye injection system may comprise between seven and twelve concentrated liquid dye cartridges. In various embodiments, the controller is further configured to cause the dye injection system to dispense the volume of concentrated liquid dye that contains the amount of dyestuff that can be substantially absorbed by the at least one garment based at least in part on the user-selected desired garment color. In various embodiments, the controller may be further configured to, based at least in part on a user-selected desired garment color, cause one or more of a plurality of concentrated liquid dye cartridges to dispense concentrated liquid dye into the dyeing chamber to produce the user-selected desired garment color during the dye cycle. In certain embodiments, the apparatus may further comprise a user interface configured to enable a user to select the desired garment color. In various embodiments, the dispensed volume of concentrated liquid dye contains an amount of dyestuff that is substantially less than or equal to a dyestuff absorption capacity of the at least one garment Various embodiments are directed to a method of dyeing garments, the method comprising: providing an apparatus for dyeing garments comprising: a dye injection system configured to dispense concentrated liquid dye; and a dyeing machine comprising a dyeing chamber configured for dyeing at least one garment in a dyebath; receiving at least one garment and a volume of solvent in the dyeing chamber of the dyeing machine; receiving at least one garment parameter corresponding to the at least one garment; based at least in part on the at least one received garment parameter, dispensing, via the dye injection system, a volume of concentrated liquid dye that contains an amount of dyestuff that can be substantially absorbed by the at least one garment so as to create a dyebath, wherein the dyebath comprises the concentrated liquid dye dispensed from the dye injection system and the volume of solvent; and executing a dye cycle such that substantially all of the dyestuff in the dispensed volume of concentrated liquid dye is absorbed by the at least one garment within the dyeing chamber.

In various embodiments, the dyestuff in the dispensed volume of concentrated liquid dye is configured such that a resultant dyebath disposed within the dyeing chamber of the dyeing machine upon execution of the dye cycle is at least substantially free of additive dyeing enhancement agents, and wherein executing the dye cycle comprises maintaining the dyebath at a substantially ambient temperature. In various embodiments, the at least one garment parameter comprises a garment weight corresponding to a weight of the at least one garment.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Reference will now be made to the accompanying drawings, which are not necessarily drawn to scale, and wherein.

DETAILED DESCRIPTION

Figure 1:
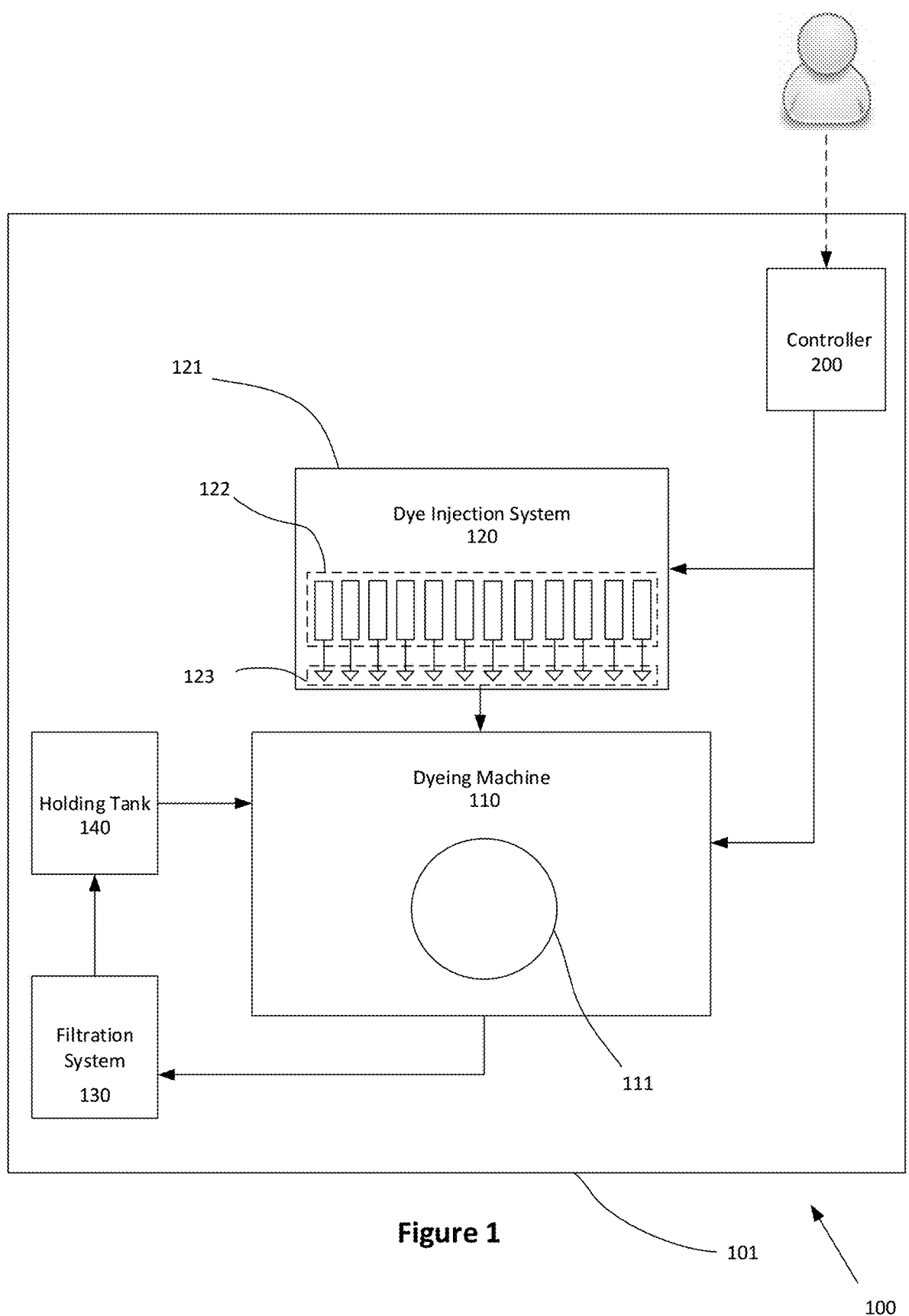
FIG. 1 illustrates a schematic diagram of an exemplary dyeing apparatus.

The following description should be read with reference to the drawings wherein like reference numerals indicate like elements throughout the several views. The detailed description and drawings show several embodiments which are meant to be illustrative of the disclosure. It should be understood that any numbering of disclosed features (e.g., first, second, etc.) and/or directional terms used in conjunction with disclosed features (e.g., front, back, top, bottom, side, and the like) are relative terms indicating illustrative relationships between the pertinent features.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean " " serving as an example, instance, or illustration. "Any implementation described herein as an " " example" or "exemplary embodiment" is not necessarily preferred or advantageous over other implementations.

Overview

Described herein are methods and apparatuses for efficiently dyeing garments that enable on-demand dyeing of garments in a substantially closed-loop system. As will be appreciated from the description herein, various disclosed methods and apparatuses minimize waste and environmental impact. In an example implementation, a method and apparatus for dyeing garments may be utilized to dye garments on a scalable level (e.g., individual garments, small batches of garments, or large batches of garments). It should be understood that while various embodiments described herein are directed to dyeing a garment, the method and apparatus embodiments disclosed herein may be configured to dye materials other than a garment (e.g., garment thread, yarn, woven sheets, any colorable fabric, or any other dye absorbent material).

In various embodiments, the method and apparatus use a predetermined amount of a concentrated liquid dye—which, as described in greater detail herein, is void of various salts (e.g., Sodium Chloride, Sodium Sulphate) and various other additives (e.g., soda ash, caustic, etc.) that are used in conventional dyeing processes. In such embodiments, the amount of concentrated liquid dye used is based on a garment parameter corresponding to the dyestuff absorption capacity of the garment (e.g., the weight (or mass) of the fiber in the garment being dyed).

In such an exemplary implementation, the concentrated liquid dye may consist primarily of dyestuff and water, and may be dispensed directly into a dyeing machine. Within the dyeing machine, the dispensed concentrated liquid dye is mixed with the dyeing solvent (e.g., water) at the point of dyeing to create a dyebath. A cationized garment in the dyeing machine may then absorb all of the dyestuff present in the dyebath (e.g., as a result of the weight-based injection of a predetermined amount of concentrated liquid dye). This process thereby leaves a resultant water void of anything but trace contaminants (e.g., less than 5% contaminant concentration), rendering the resultant water suitable for direct reuse in subsequent dyeing processes.

In various implementations, prior to reuse in the dyeing process, the remaining water may be processed using a filtration system, wherein a supplemental material, for example, cutting scraps from the creation of the garments, may be used to absorb any remaining volume of dyestuff within the dyebath. Such an exemplary system configuration allows subsequent garments to be dyed with different dye color combinations using the same solvent, thereby enabling a dyeing process that utilizes a closed-loop water system and maintains the flexibility to dye garments different colors in subsequent uses. An exemplary closed-loop water system as described herein may not only eliminate the massive water consumption that defines many traditional dyeing processes, but it also may eliminate the need for bulky water holding tanks, effectively minimizing the footprint of a dyeing apparatus.

In one example implementation, the amount of water present within the system may become irrelevant to the dyeing process, as long as the garments are able to completely absorb the dyestuff, as the relationship driving dye absorption is the ratio of volume of dyestuff to weight of the garment. The complex chemical calculation required by traditional dyeing processes in order to ensure optimal dyeing conditions is drastically simplified by effectively eliminating the liquor-to-goods ratio as a variable to be tuned. As described herein, such an exemplary configuration enables a simplified dyeing process, wherein, given a selected resultant garment color, the amount of concentrated liquid dye injected into the dyeing machine is based solely on the weight of the garment being dyed.

In various applications, due to the minimized physical and environmental footprint and a simplified chemical calculus, the improved dyeing process as disclosed herein may enable a garment to be dyed a selected color on-demand, based on user input in either a retail or manufacturing setting.

Further described herein are systems and methods for efficiently dyeing a patterned garment that enable on-demand patterned cationizing of garments and create a predetermined pattern of dye when the garments are subsequently subjected to a dyeing process. As will be appreciated from the description herein, the disclosed methods are substantially automated, agile, and minimize waste and environmental impact. In an example implementation, a method for dyeing a patterned garment may be utilized on a scalable level (e.g., individual garments, small batches of garments, or large batches of garments). It should be understood that the methods for dyeing a patterned garment as described herein may be utilized independent of, or in combination with, the disclosed methods and apparatuses for dyeing garments, as described herein.

In various embodiments, a method of dyeing a patterned garment may comprise selectively applying a cationic treatment agent to one or more areas on a garment to create localized cationic patterns. The cationic treatment agent may be applied to the garment using various techniques, such as, for example screen printing, spraying, and/or digital printing. In such circumstances, when the garment is subsequently subjected to a dyeing operation, substantially all of a volume of dyestuff absorbed by the garment may be absorbed by those areas of the garment to which the cationic treatment agent has been applied, while the untreated garment areas maintain the original garment color. Further, the depth of shade of the colored pattern may be selectively varied by changing one or more of: the volume of dyestuff used in the dyeing operation, the dye cycle runtime, and the concentration of cationic treatment agent applied at the garment area ("cationic concentration""). As described herein, selectively applying a localized volume of cationic pretreatment to create a colored pattern on a garment eliminates the need for subsequent reductive processes which are often required to achieve a desired pattern. Thus, as described herein, the present invention reduces both the amount of effluent discharged during the dyeing process, and the production time associated with manufacturing a patterned garment.

Apparatus for Dyeing

As illustrated in FIG. 1, an exemplary dyeing apparatus 100 may comprise an apparatus housing 101, dyeing machine 110, a dye injection system 120, a filtration system 130, one or more holding tanks 140, and a controller 200.

In various embodiments the dyeing machine 110 may comprise a commercial dyeing vessel configured to receive one or more cationized garments. The dyeing machine 110 may be further configured to receive a volume of solvent and a volume of concentrated liquid dye directly dispensed from the dye injection system 120 positioned adjacent the dyeing machine 110. The dyeing machine 110 may be positioned on top of a supporting surface such as, for example, a floor. In various embodiments, the dyeing machine 110 may be configured to execute a dye cycle. The dye cycle comprises mixing one or more volumes of concentrated liquid dye dispensed directly into the dyeing machine and dyeing a garment within the dyeing machine 110. As described herein, the dyeing machine 110 may be configured to execute a dye cycle such that substantially all of the dyestuff in a volume of concentrated liquid dye dispensed into the dyeing machine is absorbed by the garment (or garments) within the dyeing machine. In various embodiments, the dyeing machine may comprise a machine configured for beam dyeing, yarn dyeing, jigger dyeing, winch dyeing, soft flow dyeing or airflow dyeing processes.

In various embodiments, the dyeing machine 110 may comprise a dyeing chamber configured for dyeing at least one garment in a dyebath. The dyeing chamber may be configured to receive at least one garment and a dyebath (e.g., a volume of solvent, such as water, and a volume of concentrated liquid dye). For example, the dyeing chamber may comprise an internal chamber disposed within the housing 101 of the dyeing machine 110. In the illustrated embodiment, the dyeing machine's internal chamber is an inner cylindrical chamber 111. In some embodiments, inner cylindrical chamber 111 of the dyeing machine 110 may be configured to have a volumetric capacity of, for example, between 10 and 10,000 liters and rotate with a speed between, for example, 1 and 100 RPM during a dye cycle. In various embodiments, the rotation speed of the dyeing machine's inner cylindrical chamber 111 may be constant or may be varied throughout a dye cycle to facilitate relative motion between a garment and a dyebath in order to encourage engagement of the garment with the volume of dyestuff present within the dyebath.

In various embodiments, the dyebath may comprise a volume of solvent and a volume of concentrated liquid dye. Accordingly, the dyebath may consist essentially of a volume of solvent and a volume of concentrated liquid dye throughout a dye cycle. In embodiments in which the concentrated liquid dye itself comprises water and dyestuff, the dyebath may likewise comprise a volume of water and an amount of dyestuff (dispensed via the concentrated liquid dye).

In various embodiments, the dyeing machine 110 may be configured maintain the dyebath at a substantially ambient temperature during a dye cycle. For example, depending on the classification of the dyes used (e.g., Reactive, Direct, or Acid) the dyeing machine may be configured maintain a dyebath temperature of between 18 and 95 degrees Celsius throughout a dye cycle. As described herein, by operating a dye cycle at a substantially ambient temperature, the dyeing machine 110 may avoid having to heat the dyebath to temperatures substantially higher than ambient temperature (e.g., 20 degrees Celsius), thereby drastically reducing the amount of energy consumed during the dyeing process in comparison to traditional dyeing processes. The dyeing machine 110 may be configured to execute a dye cycle for a runtime lasting a period of time that is related to the weight of the garment in the dyeing machine, the depth of the shade of the resultant garment color, and the exhaustion of the dyestuff into the fiber of the garment. In an exemplary implementation, a dye cycle may comprise a length of time of between 20 and 60 minutes (e.g., between 30 and 45 minutes).

In various embodiments, the dyeing machine 110 may be fluidly connected to a filtration system 130. In such an exemplary embodiment, after the completion of a dye cycle, the dyeing machine 110 may be configured to dispense the dyebath—comprising a volume of solvent and any residual volume of dyebath not absorbed by the garment—such that the dyebath may be directed to the filtration system 130. Further, the dyeing machine 110 may be fluidly connected to one or more holding tanks 140. In various embodiments, before the execution of a dye cycle, the dyeing machine 110 may be configured to receive a volume of at least substantially clean solvent from either the one or more holding tanks 140 or directly from the filtration system 130. In various embodiments, the volume of solvent received by the dyeing machine 110 may be substantially equal to or less than the volumetric capacity of the dyeing machine 110. Further, in various embodiments, the dyeing machine 110 may comprise one or more liquid flow meters positioned at a solvent inlet and/or a solvent outlet, each respectively configured to measure the volume of water being received by and dispensed by the dyeing machine 110. The dyeing machine 110 may further comprise a liquid level indicator configured to measure a volume of water present within the dyeing machine 110.

In various embodiments, the dyeing machine may be configured to wash and/or dry the garment after a dye cycle has completed and the remaining dyebath has been dispensed from the dyeing machine 110. In various embodiments, the garment may be washed one or more times in order to wash away a volume of hydrolyzed dye from the garment. In various embodiments, the number of times a garment is washed may depend on the depth of the shade of the user-selected garment output color.

In various embodiments, the dyeing machine 110 may further comprise a weight sensor (e.g., a scale) to determine the weight of the garment to be dyed. In various embodiments, the weight sensor may be either incorporated within the dyeing machine 110 or included as a stand-alone component. In various embodiments, the weight sensor may be configured to communicate the measured weight to the controller 200.

As just one example, the dyeing machine 110 may comprise a Flainox NRG, E-Color and Essiccatoi machines, or any other suitable dyeing machine having a configuration as described herein.

In various embodiments, the dye injection system 120 may be positioned adjacent the dyeing machine 110 such that one or more volumes of concentrated liquid dye may be dispensed from the dye injection system 120 directly into the dyeing machine 110. The dye injection system 120 may comprise a dye housing 121 configured to house each of the one or more volumes of concentrated liquid dye and the corresponding dispense machinery. As described herein, concentrated liquid dye may comprise an amount of dyestuff and a volume of solvent, and, based on the composition of the dyestuff, may be associated with a unique color. For example, the concentrated liquid dye used in various embodiments may consist only of water and dyestuff (e.g., chromophore). In various embodiments, the concentrated liquid dye may be void of various additives traditionally used to enhance the percentage of dye uptake in the dyeing process, such as, for example, various added salt content (e.g., Sodium Chloride, Sodium Sulphate), alkaline content (e.g., Sodium Hydroxide, Sodium Carbonate), or other contaminant. In certain embodiments, the concentrated liquid may include—in addition to water and dyestuff—one or more lifespan enhancing agents (e.g., Sodium Tripolyphosphate and/or an antimicrobial agent) configured to expand the useful lifespan of the concentrated liquid dye.

In various embodiments, the one or more volumes of concentrated liquid dyes may be respectively stored in one or more concentrated liquid dye cartridges 122. The dye housing 121 may be configured to secure and position each of the one or more concentrated liquid dye cartridges 122 such that they may be fluidly connected to a respective dispense header 123. In various embodiments, the dye injection system 120 may comprise between one and twenty (e.g., between seven and twelve) concentrated dye cartridges 122, each housing a concentrated liquid dye associated with a respective concentrated liquid dye color. In various embodiments, the one or more corresponding dye dispense headers 123 may be configured to direct the flow of a volume of concentrated liquid dye dispensed from a concentrated liquid dye cartridge 122 into the dyeing machine 110. The exemplary apparatus illustrated in FIG. 1 comprises twelve concentrated liquid dye cartridges 122 and twelve corresponding dye dispense headers 123.

As described herein, the dye injection system 120 may be configured to facilitate the dispense of one or more volumes of concentrated liquid dye into the dyeing machine so as to produce a garment of a pre-selected resultant garment color. In various embodiments, each of the concentrated liquid dyes may be respectively associated with a concentrated liquid dye color. As non-limiting examples, various concentrated liquid dyes may include Orange One, Orange Two, Yellow One, Yellow Two, Blue One, Turquoise Three, Red Two, and/or the like. One or more concentrated liquid dyes may be dispensed at various ratios such that the total collective concentrated liquid dye dispensed into the dyeing machine 110 may comprise a dye input color configured to produce a resultant garment color pre-selected by a user. As non-limiting examples, various resultant garment colors may include exemplary proprietary colors with manufacturer specified characteristics (e.g., referred to herein for convenience as Light Orange, Bold Orange, Pale Yellow, Dark Yellow, Dark Blue, Light Turquoise, Dark Red and the like). In various embodiments, each resultant garment color may be associated with a depth of shade (e.g., Light Orange having a lighter depth of shade than Bold Orange). In various embodiments, the percentage allocation of the respective concentrated liquid dye colors (i.e., the ratio of the respective concentrated liquid dyes dispensed) defines the dye input color and affects the shade of the resultant garment color. Further, as described herein, a depth of shade of a resultant garment color may correspond, at least in part, to a total amount of dyestuff (per unit weight or other garment parameter) required to produce a garment having the resultant garment color. For example, in an exemplary circumstance wherein a first resultant garment color has a bolder depth of shade than a lighter depth of shade of a second resultant garment color, a greater total amount of dyestuff (e.g., per unit weight of garment dyed) may be required in order to produce a garment comprising the first resultant garment color.

Further, in various embodiments, the volume of each of the respective concentrated liquid dyes dispensed (i.e., the amount of the total collective concentrated liquid dye) may be based at least in part on a garment parameter corresponding to the at least one garment in the dyeing machine 110. In various embodiments, a garment parameter may be a characteristic of a garment (or group of garments) that defines, at least in part, the capacity of the garment for absorbing a volume of dyestuff (e.g., the dyestuff absorption capacity of a garment). In other words, a garment parameter may be a feature or characteristic of the garment (or group of garments) known to correspond to a dyestuff absorption capacity for the garment (e.g., the total amount of dyestuff the garment or group of garments is capable of absorbing from a dyebath). As non-limiting examples, a garment parameter may be: a garment weight; a garment size (e.g., for a known garment type where the garment size corresponds to a known absorption capacity); a garment SKU; and any garment value corresponding to a known dyestuff absorption capacity. For example, in various embodiments, the volume of each of the respective concentrated liquid dyes dispensed (i.e., the amount of the total collective concentrated liquid dye) may proportionally correspond to the weight of the garment in the dyeing machine 110 (e.g., such that to produce a garment of a resultant garment color, the amount of total collective concentrated liquid dye dispensed from a dye injection system depends on the weight of the garment). For example, the amount of dyestuff within the total collective volume concentrated liquid dye dispensed in order to dye a garment may be less than the dyestuff absorption capacity of the garment.

Further, for example, in various embodiments, the volume of each of the respective concentrated liquid dyes dispensed (i.e., the amount of the total collective concentrated liquid dye) may correspond to the cationic concentration of the garment in the dyeing machine 110. In various embodiments, a maximum volume of concentrated liquid dye able to be absorbed by a garment may be known to produce a resultant garment color of full depth. This maximum volume of absorbable concentrated liquid dye also defines the maximum volume of concentrated liquid dye that may be dispensed into the system for dyeing of the garment. As will be appreciated from the description herein, the maximum volume of absorbable concentrated liquid dye is dependent on the concentration of the concentrated liquid dye (e.g., the amount of dyestuff per unit volume of solvent comprising the concentrated liquid dye) and the weight of the garment to be dyed (e.g., heavier garments being capable of absorbing more dyestuff than lighter garments of the same material).

In various embodiments, a lesser amount of dye may be injected into the machine in order to affect the depth of the shade of dye input color (e.g., to produce a lighter shade of the dye input color). As a non-limiting example, in various embodiments, a first resultant garment color corresponding to a lighter depth of shade may require a lesser amount of dyestuff (per unit weight of the garment) to be dispensed into the machine (e.g., via one or more volumes of concentrated liquid dye) than a second resultant garment color corresponding to a bolder depth of shade. Accordingly, in various embodiments, the resultant garment color may be a function of both the percentage allocation of the respective concentrated liquid dye colors and the amount of concentrated liquid dye dispensed into the system (relative to the weight of the garment being dyed).

The controller 200 may be configured to calculate both the appropriate ratio and the appropriate volume of each of the respective concentrated liquid dyes to be dispensed based on input received by a user at a user interface. For example, based at least in part on at least one garment parameter, the controller may be configured to cause the dye injection system to dispense a volume of concentrated liquid dye that contains an amount of dyestuff that can be substantially absorbed by the at least one garment (i.e., which is substantially less than or equal to the dyestuff absorption capacity of the at least one garment). The dye injection system 120 may be configured to receive communications from the controller 200 and accordingly dispense the appropriate amount of each of the concentrated liquid dyes into the dyeing machine 110.

In various embodiments, the one or more volumes of concentrated liquid dye may be dispensed from the respective dispense headers 123 directly into the dyeing machine 110. In various other embodiments, the volumes of concentrated liquid dye may be dispensed from the respective dispense headers 123 into a mixing tank to facilitate sufficient mixing before being further dispensed into the dyeing machine 110. In further embodiments, the one or more volumes of concentrated liquid dye may be dispensed from the respective dispense headers 123 and into a common delivery conduit configured to receive the one or more volumes of concentrated liquid dye and deliver each volume to the dyeing machine 110. In such embodiments, the one or more volumes of concentrated liquid dye may be present within the delivery conduit at substantially the same time so as to facilitate a mixing of the respective volumes within the delivery conduit. In certain embodiments, the delivery conduit may further comprise mixing hardware present within the delivery conduit configured to further facilitate mixing by creating a tortious fluid flow. The delivery conduit may also be fluidly connected to a concentrated liquid dye collection funnel or any other suitable collection mechanism configured to capture each of the one or more dispensed volumes of concentrated liquid dye and direct them into the delivery conduit.

As just one example, the dye injection system 120 may comprise a ColorService SRL JIT automated dyestuff dosing machine, a Datacolor Autolab TF dispense system, or any other suitable dye injection system having a configuration as described herein.

In various embodiments, the filtration system 130 may be configured to receive a dyebath from a dyeing machine 110 after a dye cycle has been completed and remove the entirety of a residual volume of dyestuff remaining in the dyebath. In various embodiments, the filtration system 130 may comprise a reservoir and a supplemental material. The reservoir may be configured to retain the volume of dyebath dispensed from the dyeing machine 110. In various embodiments, the reservoir may be made from a non-absorbent inert material such as, for example, polypropylene. In various embodiments, the supplemental material of the filtration system 130 may be configured to be submerged into the volume of the dyebath so as to interact with and absorb the entirety of a residual volume of dyestuff. In one exemplary apparatus, the supplemental material may comprise excess fabric, fiber, yarn, cotton and may be cationized to facilitate dyestuff absorption. For example, the supplemental material may be sewn into a polypropylene container (i.e., a "tea-bag") for the purposes of facilitating the supplemental material's interaction with the contents of the dyebath and maintaining control of the supplemental material during its submersion. Alternatively, in various embodiments, the filtration system 130 may comprise a vessel with one or more strainers configured to remove the entirety of the residual volume of dyestuff from the dyebath. Further, in an alternative environment, the filtration system 130 may not comprise a reservoir, but, instead, may comprise only a supplemental material configured to be submerged in a dyebath after the dye cycle has been completed but before the dyebath has been dispensed from the dyeing machine 110. In various embodiments, the filtration system 130 may further comprise a sensor configured to detect when the dyebath has been sufficiently cleaned by measuring the transmission of light through a volume of the dyebath to quantify the presence of any remaining impurities.

In various embodiments, after the resultant volume of dyestuff has been removed from the dyebath, the filtration system 130 may be configured to dispense the volume of substantially clean solvent into one or more holding tanks 140 to be stored. Alternatively, the filtration system 130 may be configured to dispense the volume of substantially clean solvent back into the dyeing machine 110 for use in the subsequent dye cycle.

As just one example, the filtration system 130 may comprise an Axium Process Dyehouse Effluent Treatment and Water Reuse System, or any other suitable filtration system having a configuration as described herein.

In various embodiments, the one or more holding tanks 140 may comprise one or more containers configured to store excess solvent present within the closed-loop system of the dyeing apparatus 100 as described herein. In various embodiments, each of the one or more holding tanks 140 may hold a volume of solvent that is substantially equal to or larger than a volume of solvent that may be used to define a dyebath. In various embodiments, the one or more holding tanks 140 may be configured to receive a volume of substantially clean solvent from either the filtration system 130 or the dyeing machine 110. In various embodiments, the one or more holding tanks 140 may be configured for holding a volume of solvent between dyeing cycles. The one or more holding tanks 140 may be further configured to dispense a volume of solvent into the dyeing machine 110. The one or more holding tanks 140 may not be present in various embodiments of the garment dyeing apparatus 100 as described herein.

As just one example, the one or more holding tanks 140 may comprise any suitable commercially available liquid holding tank having a configuration as described herein.

Figure 2:
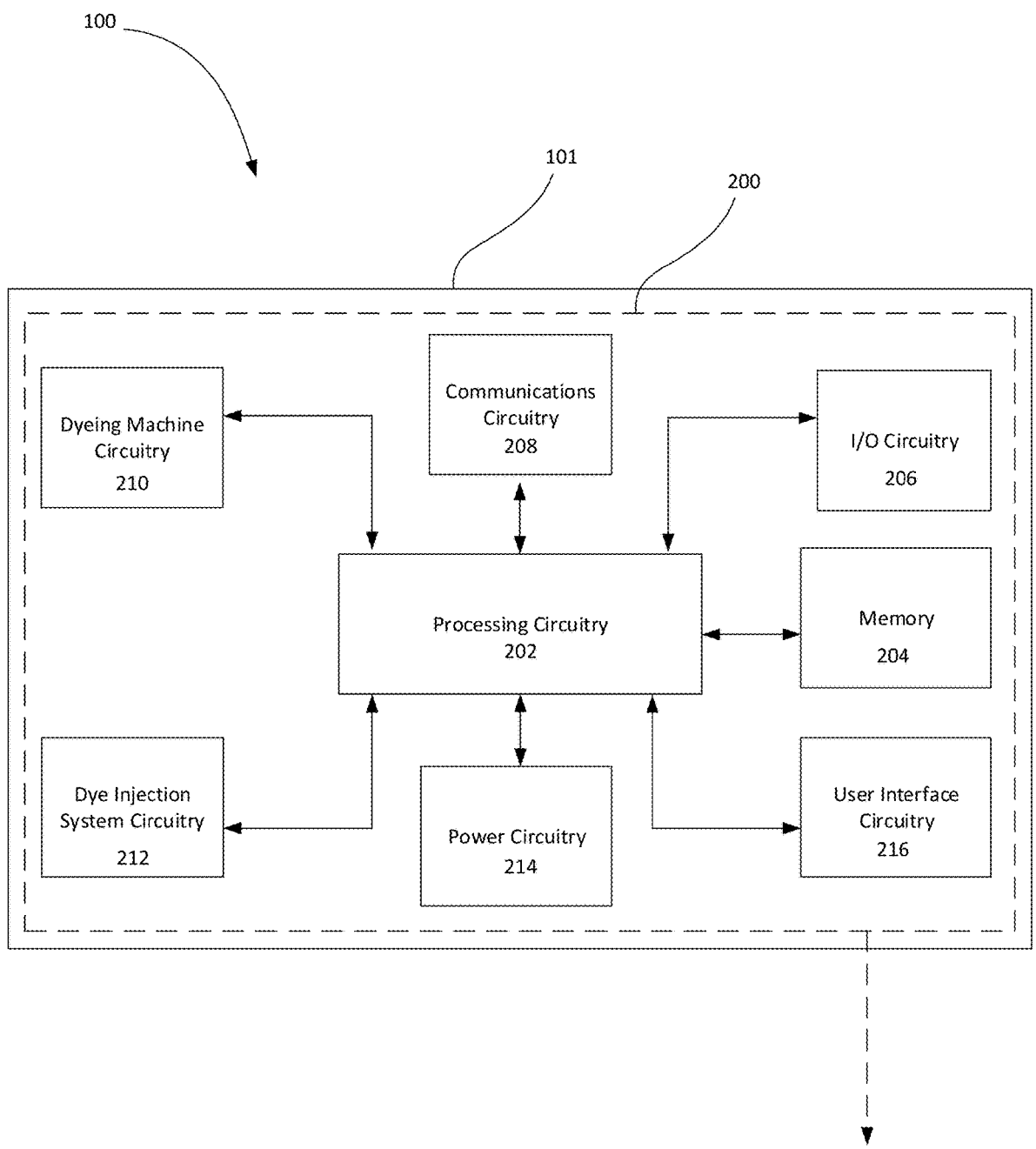
FIG. 2 schematically illustrates an exemplary apparatus in accordance with various embodiments.

As illustrated in FIG. 2, an exemplary controller 200 may comprise processing circuitry 202, memory 204, input-output circuitry 206, communications circuitry 208, dyeing machine circuitry 210, dye injection system circuitry 220, power circuitry 214, and user interface circuitry 216. The exemplary controller 200 may be configured to execute the operations described above with respect to FIG. 1 and below with respect to FIG. 3. In various embodiments, the controller 200 may be disposed within the apparatus housing 101 or may exist external to the apparatus housing as a distinct component electronically connected to the various other components that comprise the apparatus as described herein. Although some of these components 202-216 are described with respect to their functional capabilities, it should be understood that the particular implementations necessarily include the use of particular hardware to implement such functional capabilities. It should also be understood that certain of these components 202-216 may include similar or common hardware. For example, two sets of circuitry may both leverage use of the same processor, network interface, storage medium, or the like to perform their associated functions, such that duplicate hardware is not required for each set of circuitry.

The use of the term "circuitry"" as used herein with respect to components of the dyeing apparatus 100 therefore includes particular hardware configured to perform the functions associated with respective circuitry described herein. Of course, while the term "circuitry" should be understood broadly to include hardware, in some embodiments, circuitry may also include software for configuring the hardware. For example, in some embodiments, "circuitry" may include processing circuitry, storage media, network interfaces, input-output devices, and other components. In some embodiments, other elements of the controller 200 may provide or supplement the functionality of particular circuitry. For example, the processing circuitry 202 may provide processing functionality, memory 204 may provide storage functionality, and communications circuitry 208 may provide network interface functionality, among other features.

In some embodiments, the processing circuitry 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. For example, the memory 204 may be an electronic storage device (e.g., a computer readable storage medium). In another example, the memory 204 may be a non-transitory computer-readable storage medium storing computer-executable program code instructions that, when executed by a computing system, cause the computing system to perform the various operations described herein. The memory 204 may be configured to store information, data, content, signals applications, instructions (e.g., computer-executable program code instructions), or the like, for enabling the controller 200 to carry out various functions in accordance with example embodiments of the present disclosure. For example, the memory 204 may be configured to store garment type data; garment weight data; concentrated liquid dye cartridge fill status data; dyestuff color combination data; concentrated liquid dye data (e.g., dyestuff concentrations); dye cycle configuration techniques; concentrated liquid dye dispense calculations; dyestuff configuration data; dye injection techniques; energy consumption data; water consumption data; monitored data; any other suitable data or data structures; or any combination or combinations thereof. It will be understood that the memory 204 may be configured to store partially or wholly any electronic information, data, data structures, embodiments, examples, figures, processes, operations, techniques, algorithms, instructions, systems, apparatuses, methods, or computer program products described herein, or any combination thereof.

The processing circuitry 202 may be embodied in a number of different ways and may, for example, include one or more processing devices configured to perform independently. Additionally, or alternatively, the processing circuitry 202 may include one or more processors configured in tandem via a bus to enable independent execution of instructions, pipelining, multithreading, or a combination thereof. The use of the term "processing circuitry" may be understood to include a single core processor, a multi-core processor, multiple processors internal to the apparatus, remote or "cloud" processors, or a combination thereof.

In an example embodiment, the processing circuitry 202 may be configured to execute instructions stored in the memory 204 or otherwise accessible to the processing circuitry 202. Alternatively, or additionally, the processing circuitry 202 may be configured to execute hard-coded functionality. As such, whether configured by hardware or software methods, or by a combination of hardware with software, the processing circuitry 202 may represent an entity (e.g., physically embodied in circuitry) capable of performing operations according to an embodiment of the present disclosure while configured accordingly. As another example, when the processing circuitry 202 is embodied as an executor of program code instructions, the instructions may specifically configure the processor to perform the operations described herein when the instructions are executed.

In some embodiments, the controller 200 may include input-output circuitry 206 that may, in turn, be in communication with processing circuitry 202 to provide output to the user and, in some embodiments, to receive input such as a command provided by the user. The input-output circuitry 206 may comprise a user interface, such as a graphical user interface (GUI), and may include a display that may include a web user interface, a GUI application, a mobile application, a client device, or any other suitable hardware or software. In some embodiments, the input-output circuitry 206 may also include a keyboard, a mouse, a joystick, a display device, a display screen, a touch screen, touch areas, soft keys, a microphone, a speaker (e.g., a buzzer), a light emitting device (e.g., a red light emitting diode (LED), a green LED, a blue LED, a white LED, an infrared (IR) LED, an ultraviolet (UV) LED, or a combination thereof), or other input-output mechanisms. The processing circuitry 202, input-output circuitry 206 (which may utilize the processing circuitry 202), or both may be configured to control one or more functions of one or more user interface elements through computer-executable program code instructions (e.g., software, firmware) stored in a non-transitory computer-readable storage medium (e.g., memory 204). Input-output circuitry 206 is optional and, in some embodiments, the controller 200 may not include input-output circuitry. For example, where the controller 200 does not interact directly with the user, the controller 200 may generate user interface data for display by one or more other devices with which one or more users directly interact and transmit the generated user interface data to one or more of those devices. For example, the controller 200, using user interface circuitry 216, may generate user interface data for display by one or more display devices and transmit the generated user interface data to those display devices.

The communications circuitry 208 may be any device or circuitry embodied in either hardware or a combination of hardware and software that is configured to receive or transmit data from or to a network or any other device, circuitry, or module in communication with the controller 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. In some embodiments, the communication interface may include the circuitry for interacting with the antenna(s) to cause transmission of signals via the antenna(s) or to handle receipt of signals received via the antenna(s). These signals may be transmitted or received by the controller 200 using any of a number of Internet, Ethernet, cellular, satellite, or wireless technologies, such as IEEE 802.11, Code Division Multiple Access (CDMA), Global System for Mobiles (GSM), Universal Mobile Telecommunications System (UMTS), Long-Term Evolution (LTE), Bluetooth® v1.0 through v5.0, Bluetooth Low Energy (BLE), infrared wireless (e.g., IrDA), ultra-wideband (UWB), induction wireless transmission, Wi-Fi, near field communications (NFC), Worldwide Interoperability for Microwave Access (WiMAX), radio frequency (RF), RFID, or any other suitable technologies.

The dyeing machine circuitry 210 includes hardware components designed or configured to receive, process, generate, and transmit data related to the dyeing machine's execution of a dye cycle and interaction with other components of the dyeing apparatus 100, such as dye cycle commencement and completion signals. In various embodiments, the dyeing machine circuitry 210 may be configured to receive a dye cycle commencement command based on signals transmitted from, for example, the input-output circuitry 206. Further, the dyeing machine circuitry 210 may be configured to communicate with the memory 204 and process commands related to dye cycle configuration (e.g., run time, dyebath temperature). In various embodiments, the dyeing machine circuitry 210 may be configured to transmit a dye cycle completion signal to one or more circuitry components of the controller 200.

The dye injection system circuitry 212 includes hardware components designed or configured to receive, process, generate, and transmit data, such as color composition data and concentrated liquid dye dispense data. In various embodiments, the dye injection system circuitry 212 may be configured to receive a user-selected resultant garment color signal from the input-output circuitry 206. In various embodiments, the dye injection system circuitry 212 may be configured to communicate with the memory 204 and retrieve the concentrated liquid dye ratio data associated the user-selected resultant garment color indicated in the signal received. The concentrated liquid dye ratio data may comprise the ratios of each of the respective concentrated liquid dyes to be dispensed (i.e., the recipe) in order to produce a dye input color associated with a resultant garment color. For example, in various embodiments, the concentrated liquid dye ratio data may comprise dyestuff concentrations of each of the concentrated liquid dyes (i.e., the ratio of dyestuff to water within the concentrated liquid dye), as well as ratios of each of the respective dyestuffs to be dispensed in order to produce a resultant garment color. In various embodiments, the memory 204 may store concentrated liquid dye ratio data for each of the resultant garment colors available to be selected. In various embodiments, the concentrated liquid dye ratio data may comprise one or more lookup tables associated with each of the available resultant garment colors (e.g., correlating the appropriate ratio of concentrated liquid dye colors and/or the appropriate total amount of dye to be dispensed in order to produce a garment of the resultant garment color). By way of non-limiting example, an exemplary look up table may include a ratio of various concentrated liquid dye colors corresponding to, for example, various proprietary resultant garment color, as follows:

| Proprietary Color | Concentrated Liquid Dye Components | Parts per Whole |
|---|---|---|
| Dark Blue | Red Two | 1 (5.56%) |
| | Blue Two | 15 (83.33%) |
| | Turquoise One | 2 (11.21%) |
| Light Red | Yellow One | 2 (28.57%) |
| | Orange One | 1 (14.29%) |
| | Red Two | 4 (51.14%) |

Further, the dye injection system circuitry 212 may be configured to receive at least one garment parameter corresponding to at least one garment from one or more components of the controller 200. For example, the dye injection system circuitry 212 may be configured to receive a garment weight signal from the dyeing machine circuitry 210 (e.g., from a weight sensor) and/or the input-output circuitry 206 (e.g., a user-selected garment weight signal). Alternatively, or additionally, the dye injection system circuitry 212 may be configured to receive a user-selected garment type signal and/or a garment count signal, wherein the dye injection system circuitry 212 may be further configured to identify a garment weight corresponding to the garment type and/or garment count selected by a user. In such an exemplary embodiment, the dye injection system circuitry 212 may be configured to communicate with the memory 204 and determine the weight of the garment corresponding to the garment type. In various embodiments, the dye injection system circuitry 212 may be configured to determine, based on, for example, the weight of the garment, the appropriate magnitude factor to apply to the respective volumes of concentrated liquid dye configured to be dispensed at the ratio described above. For example, in various embodiments, the dye injection system circuitry 212 may retrieve data comprising one or more lookup tables associated with a correlation of garment weight to total volume of dyestuff required to fully dye the corresponding garment(s). In various embodiments, the total volume of dyestuff required to fully dye the corresponding garment(s) may depend on a selected resultant garment color. As a non-limiting example, in various embodiments, the total volume of dyestuff required to fully dye a first garment a proprietary resultant garment color of Dark Blue may be greater than the total volume of dyestuff required to fully dye a second garment of equal garment weight a proprietary resultant garment color of Light Red. In such embodiments, regardless of the user-selected resultant garment color, the total volume of dyestuff required to fully dye a garment of a known garment weight will not exceed the dyestuff absorption capacity of a fully cationized garment of the corresponding weight.

As described herein, the dye injection system circuitry 212 may be configured to calibrate the total volume of concentrated liquid dye dispensed by the dye injection system based at least in part on the cationic concentration of the at least one garment. The total volume of concentrated liquid dye dispensed by the dye injection system may be optimized so as to minimize the resultant volume of dyestuff remaining in the dyebath upon the execution of a dye cycle. For example, in various embodiments, the total volume of concentrated liquid dye dispensed by the dye injection system may contain an amount of dyestuff that is substantially less than or equal to the dyestuff absorption capacity of the garment. By way of non-liming example, various exemplary look up tables corresponding to various proprietary resultant garment colors may include a total amount of dyestuff and/or total collective concentrated liquid dye to be dispensed that is calibrated to, for example, various garment weights, as follows:

| Proprietary Color | Garment Weight | Total Collective Concentrated Liquid Dye Volume |
|---|---|---|
| Dark Blue | 50 grams | 9.00 mL |
| | 100 grams | 18.00 mL |
| | 150 grams | 27.00 mL |
| | 200 grams | 36.00 mL |
| Light Red | 50 grams | 3.50 mL |
| | 100 grams | 7.00 mL |
| | 150 grams | 10.50 mL |
| | 200 grams | 14.00 mL |

As a further non-liming example, various exemplary look up tables corresponding to various proprietary resultant garment colors, such as, for example, Light Red, may include various volumes of respective concentrated liquid dyes to be dispensed calibrated to, for example, various garment weights, as follows:

| Proprietary Color | Garment Weight | Concentrated Liquid Dye Components | Volume of Concentrated Liquid Dye to Dispense |
|---|---|---|---|
| Light Red | 50 grams | Yellow One | 1.00 mL |
| | | Orange One | 0.50 mL |
| | | Red Two | 2.00 mL |
| | 100 grams | Yellow One | 2.00 mL |
| | | Orange One | 1.00 mL |
| | | Red Two | 4.00 mL |
| | 150 grams | Yellow One | 3.00 mL |
| | | Orange One | 1.50 mL |
| | | Red Two | 6.00 mL |
| | 200 grams | Yellow One | 4.00 mL |
| | | Orange One | 2.00 mL |
| | | Red Two | 8.00 mL |

In various embodiments, the dye injection system circuitry 212 may be configured to transmit the results of the calculations and determinations described above to the dye injection system 120. In various embodiments, the dye injection system circuitry 212 may be configured to transmit a dye injection completion signal to one or more circuitry components of the controller 200. As a further non-limiting example, the dye injection system circuitry 212 may be configured to receive a garment pattern signal one or more components of the controller 200, wherein the dye injection system circuitry 212 may be further configured to identify a garment cationic concentration corresponding to the received garment pattern signal.

As a non-limiting example, controller 200 (e.g., dye injection system circuitry 212) may receive data corresponding to a garment weight 150 grams and a user selection of a uniform proprietary Light Red resultant garment color. As described herein, the dye injection system circuitry 212 may retrieve data from a look up table noting that for 150 grams of fully cationized cotton, in order to produce a resultant garment color of Light Red, a dye injection system should dispense 3.0 ml of Yellow One concentrated liquid dye, 1.5 ml of Orange One concentrated liquid dye, and 6.0 ml of Red Two concentrated liquid dye into an exemplary dyeing machine. In various embodiments, the dye injection system circuitry 212 may be further configured to determine a dye injection rate at which the three volumes of concentrated liquid dye may be dispensed based at least in part on the corresponding garment weight.

As a further non-limiting example, controller 200 (e.g., dye injection system circuitry 212) may receive data corresponding to two size large cotton t-shirts and a user selection of a uniform proprietary Light Red resultant garment color. As described herein, the dye injection system circuitry 212 may retrieve data from a look up table noting that a size large cotton t-shirt comprises a garment weight of 75 grams, and may further determine that the garment weight of the one or more garments to be dyed is 150 grams. As further described herein, the dye injection system circuitry 212 may retrieve data from a look up table noting that for 150 grams of fully cationized cotton, in order to produce a resultant garment color of Light Red, the ratio of Yellow One dye to Orange One dye to Red Two dye should be 2:1:4. The dye injection system circuitry 212 may retrieve data from a look up table noting that that for 150 grams of fully cationized cotton, 10.50 ml of concentrated liquid dye may be dispensed to produce a resultant garment color of Light Red. Based at least in part on the known percentage allocation of the various concentrated liquid dyes and the total collective volume of concentrated liquid dye to be dispensed, the dye injection system circuitry 212 may determine that 3.0 ml of Yellow One concentrated liquid dye, 1.5 ml of Orange One concentrated liquid dye, and 6.0 ml of Red Two concentrated liquid dye should be dispensed into a dyeing machine in order to produce two size large cotton t shirts having a Light Red resultant garment color.

As an alternative non-limiting example, controller 200 (e.g., dye injection system circuitry 212) may receive data corresponding to a garment weight of 150 grams and a user selection of a uniform custom red resultant garment color. In various embodiments, the dye injection system circuitry 212 may determine, based at least in part on data retrieved data from a look up table corresponding to a proprietary Light Red resultant garment color that is determined to be at least substantially similar to the selected custom red color, that in order to produce the custom red resultant garment color selected by the user, Yellow One concentrated liquid dye, Orange One concentrated liquid dye, and Red Two concentrated liquid dye should be dispensed at a ratio of 1:1:2. The dye injection system circuitry 212 may further determine, based at least in part on retrieved data from a look up table corresponding to a proprietary Light Red resultant garment color and a determined depth of shade of the custom red color, that that for 150 grams of fully cationized cotton, 12 ml of concentrated liquid dye may be dispensed in order to produce a resultant garment color of the user-selected custom red. Based at least in part on the determined percentage allocation of the various concentrated liquid dyes and the total collective volume of concentrated liquid dye to be dispensed, the dye injection system circuitry 212 may determine that 3.0 ml of Yellow One concentrated liquid dye, 3.0 ml of Orange One concentrated liquid dye, and 6.0 ml of Red Two concentrated liquid dye should be dispensed into the dyeing machine in order to produce a garments(s) having orange output color at a full depth of shade.

In various embodiments, the power circuitry 214 may be configured to receive power and power the controller 200. As non-limiting examples, the power circuitry 214 may comprise one or more batteries, one or more capacitors, one or more constant power supplies (e.g., a wall-outlet), and/or the like. In some embodiments, the power circuitry 214 may comprise an external power supply positioned outside of the apparatus housing 101 and configured to deliver alternating or direct current power to the controller 200. Further, in some embodiments, the power circuitry 214 may comprise an internal power supply, for example, one or more batteries, positioned within the apparatus housing 110.

The user interface circuitry 216 includes hardware components designed or configured to receive, process, generate, and transmit data, such as user interface data. In various embodiments, the user interface circuitry 216 may be configured to generate user interface data indicative of available resultant garment colors, a user-selected color, available garment types, a user-selected garment type, a user-selected garment weight, a dye cycle commencement signal, remaining dye cycle time, a dye cycle completion signal, and combinations thereof. In some embodiments, the user interface data may comprise a visual illustration previewing a user-selected garment type in a user-selected color. In some instances, the user interface data may comprise a list (e.g., a selectable drop-down list, an ordered grouping of selectable icons (e.g., clickable icons configured to be clicked by a mouse; virtual icons configured to be displayed on a touchscreen and pressed by a user's finger), a text-based prompt, a voice-based prompt) of available resultant garment colors, garment weights, and/or garment types. For instance, the user interface circuitry 216 may include hardware components designed or configured to generate the user interface data based on any embodiment or combination of embodiments described with reference to FIGS. 1-3.

In some embodiments, the user interface circuitry 216 may be in communication with a display device (e.g., input-output circuitry 206, a user device, or a display device communicatively coupled thereto) and thus configured to transmit the user interface data to the display device. For example, the user interface circuitry 216 may be configured to generate user interface data and transmit the generated user interface data to the input-output circuitry 206, and the input-output circuitry 206 may be configured to receive the user interface data and display the received user interface data on one or more display screens. In various embodiments, for example, the user interface circuitry may be configured to receive user input (e.g., a user selection) at a display device (e.g., a display screen) arranged proximate to and/or at a dyeing machine 110.

In some embodiments, each of the dying machine circuitry 210, dye injection circuitry 212, and user interface circuitry 216 may include a separate processor, specially configured field programmable gate array (FPGA), application specific interface circuit (ASIC), or cloud utility to perform the above functions. In some embodiments, the hardware components described above with reference to the dying machine circuitry 210, dye injection circuitry 212, and user interface circuitry 216 may, for instance, utilize communications circuitry 208 or any suitable wired or wireless communications path to communicate with a user device, each other, or any other suitable circuitry or device.

In some embodiments, one or more of the dying machine circuitry 210, dye injection circuitry 212, and user interface circuitry 216 may be hosted locally by the controller 200. In some embodiments, one or more of the dying machine circuitry 210, dye injection circuitry 212, and user interface circuitry 216 may be hosted remotely (e.g., by one or more cloud servers) and thus need not physically reside on the controller 200. Thus, some or all of the functionality described herein may be provided by a remote circuitry. For example, the controller 200 may access one or more remote circuitries via any sort of networked connection that facilitates transmission of data and electronic information between the controller 200 and the remote circuitries. In turn, the controller 200 may be in remote communication with one or more of the dying machine circuitry 210, dye injection circuitry 212, and user interface circuitry 216.

As described above and as will be appreciated based on this disclosure, embodiments of the present disclosure may be configured as systems, apparatuses, methods, mobile devices, backend network devices, computer program products, other suitable devices, and combinations thereof. Accordingly, embodiments may comprise various means including entirely of hardware or any combination of software with hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices. As will be appreciated, any computer program instructions and/or other type of code described herein may be loaded onto a computer, processor or other programmable apparatus's circuitry to produce a machine, such that the computer, processor, or other programmable circuitry that executes the code on the machine creates the means for implementing various functions, including those described herein.

In some embodiments, the user device may be embodied by one or more computing devices or systems that also may include processing circuitry, memory, input-output circuitry, and communications circuitry. For example, a user device may be a laptop computer on which an app (e.g., a GUI application) is running or otherwise being executed by processing circuitry. In yet another example, a user device may be a smartphone on which an app (e.g., a webpage browsing app) is running or otherwise being executed by processing circuitry. As it relates to operations described in the present disclosure, the functioning of these devices may utilize components similar to the similarly named components described above with respect to FIG. 2. Additional description of the mechanics of these components is omitted for the sake of brevity. These device elements, operating together, provide the respective computing systems with the functionality necessary to facilitate the communication of data with the example dyeing apparatus described herein.

In various applications, an exemplary method as disclosed herein may be implemented in, for example, either a retail or manufacturing setting.

Method of Dyeing

Figure 3:
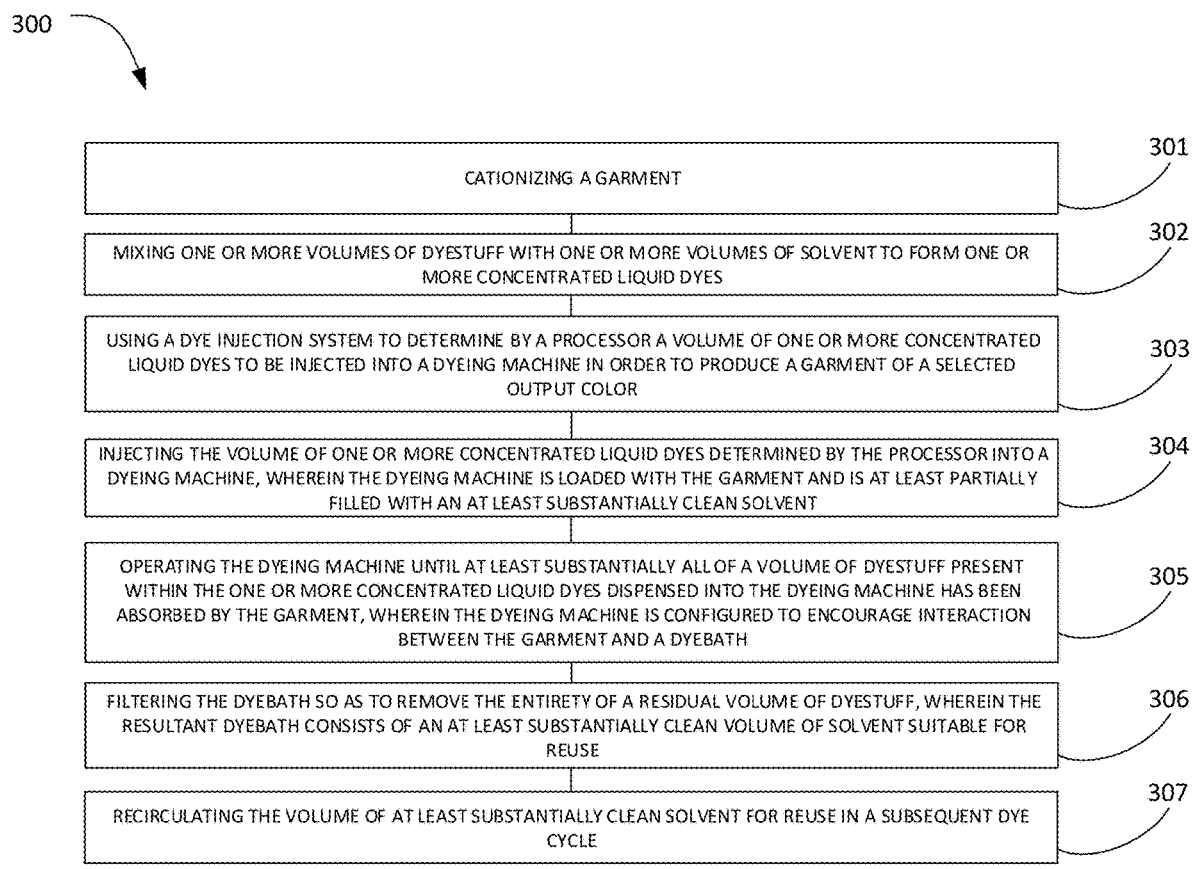
FIG. 3 illustrates a flow diagram of an exemplary method of dyeing a garment in accordance with some example embodiments described herein.

FIG. 3 illustrates a flow diagram of an example method 300 in accordance with various embodiments discussed herein.

At block 301, an exemplary method of dyeing a garment may comprise cationizing a garment such as, for example, a garment comprised of cotton. As may be generally understood, cationizing a cotton garment may comprise chemically modifying cellulosic macromolecules in order to introduce a positive charge within the garment. Specifically, cationization may comprise the introduction of amino compounds into the garment, the reaction of which may render the cellulose fibers present within the garment cationic. Cationization creates an electrostatic interaction between the positive charges on the cotton fiber and the negative charges on the anionic dye, effectively increasing the cotton's affinity for the anionic dye. In various implementations, this process may increase the amount of dye exhausted by the cotton garment during the dyeing process. Further, cationization as described herein may greatly reduce the need for large quantities of the additives traditionally used to enhance the percentage of dye uptake, such as, for example, various salts or other alkaline components, in the dyeing process. Cationization of a garment may be executed using a cationic treatment agent.

According to various embodiments, an entire garment may be cationized by applying a volume of cationic treatment agent to the entire garment. Further, particular garment areas defining less than an entire garment may be cationized by selectively applying a volume of cationic treatment agent to the particular garment area. As described herein, any given volume of cationic treatment agent contains an electronic charge. The collective electric charge of a particular volume of cationic treatment agent may be proportional to the amount of cationic treatment agent within the particular volume (i.e., volume size). As described herein, prior to reaching its threshold of dyestuff absorption (i.e., saturation point), a cationized garment area will continue to absorb dyestuff from a dyebath either until all of the dyestuff has been exhausted from the dyebath, or for as long as the garment area maintains an electrical charge. Thus, in various embodiments, the higher the cationic concentration of a particular portion of a garment, the more dyestuff that particular portion of the garment will retain (thereby increasing the depth of shade of that particular portion of the garment). Accordingly, the concentration of cationic treatment agent applied to a garment may be selectively varied to affect the depth of shade of the garment.

According to various embodiments, cationic treatment agent may be selectively applied to a garment using various application apparatuses and methods, such as, for example, screen printing, manual spraying (e.g., hand spraying), automated spraying (e.g., inkjet printing), and/or the like. In various embodiments, the cationic treatment may comprise 3-chloro-2-hydroxypropyltrimethylammonium chloride (CHPTAC). As just one example, the cationic treatment agent may comprise Dow ECOFAST™ Pure Sustainable Textile Treatment.

At block 302, an exemplary method of dyeing a garment may comprise mixing a volume of dyestuff with a volume of solvent to form a concentrated liquid dye. In various embodiments, the concentrated liquid dye may comprise a mixture of a volume of dyestuff and a volume of water. The volume of water may be sufficiently mixed with the dyestuff such that the dyestuff is maintained in a state of suspension so as to facilitate dispensing of the dyestuff into the dyeing machine as a concentrated liquid dye. In various embodiments, the concentrated liquid dye may comprise a water to dyestuff ratio of between 2:1 and 50:1 (e.g., 3:1 to 8:1). In various embodiments, an additive such as, for example, a gel may be added to the liquid concentrated dye to further facilitate a state of suspension. In various embodiments, a preservative agent, such as, for example, Sodium Tripolyphosphate and/or an antimicrobial agent may be added to the liquid concentrated dye to expand the useful lifespan of the concentrated liquid dye. It should be understood that any additive (e.g., a preservative agent) introduced into the concentrated liquid dye will not affect the percentage of dye uptake in the dyeing process.

In various embodiments, the mixing of a volume of dyestuff and a volume of solvent to create a concentrated liquid dye may be repeated with one or more volumes of dyestuff, each associated with a distinct color. The resulting concentrated liquid dyes may each be associated with a distinct color correlating to the color of their respective volume of dyestuff. As described herein, a dyeing process wherein the one or more exemplary concentrated liquid dyes are at least substantially free of various additives such as, for example, various added salt content (e.g., Sodium Chloride, Sodium Sulphate), alkaline content (e.g., Sodium Hydroxide, Sodium Carbonate), dedusting agents, or other contaminants, should be understood to minimize the number of variables that may affect a resultant garment color. As such, such exemplary liquid concentrated dyes—consisting of dyestuff and water—enable a more predictable dyeing process capable of reliably and repeatedly producing a desired resultant garment color. For example, each concentrated liquid dye may comprise a known dyestuff concentration (i.e., the ratio of dyestuff to water within the concentrated liquid dye). Using the known dyestuff concentrations and a user-selected resultant garment color input, a volume of the one or more exemplary concentrated liquid dyes may be tuned to achieve an absorption percentage of at least substantially 100% of a volume of dyestuff contained therein based solely on a proportional relationship of the volume of dyestuff to the weight of the garment being dyed. The increased predictability that accompanies eliminating input variables such as the amount of water, the amount of dye additives, and the chemistry respectively associated therewith, reduces the need for color trials (e.g., lab-dips) and color approvals, thereby enabling a dyeing process wherein fewer base concentrated liquid dyes are needed to produce a large number of available resultant garment colors.

In various embodiments, the one or more concentrated liquid dyes may define an array of between 1 and 20 (e.g., between 7 and 15) base colors (e.g., concentrated liquid dye colors) that may be selectively combined in various proportions, thus enabling a large number of available resultant garment colors. In one exemplary embodiment, a commercial dye injection system, as described herein, may be configured to produce up to 3 million dye input colors using between 7 and 15 base colors, the resultant dye input color being a color defined by a shade gamut within the realm of a given color space. For example, the between 7 and 15 base colors, used in combination, may be configured to facilitate the production a resultant garment color, the resultant garment color being one of up to 3 million colors defined by the shade gamut within the realm of the given color space.

In various embodiments, the one or more concentrated liquid dyes may be respectively stored in cartridges. The concentrated liquid dye cartridges may be disposed within a dye housing. In various embodiments, each of the one or more the concentrated liquid dye cartridges may be configured to be fluidly connected to a respective dispense header such that various proportions of the concentrated liquid dye may be injected through a dispense header into a dyeing machine, mixing tank, or delivery conduit.

At block 303, an exemplary method of dyeing a garment may comprise using a dye injection system to determine by a processor a ratio of one or more volumes of concentrated liquid dye to be injected into a dyeing machine in order to produce a garment of a selected resultant color. In various embodiments, a garment parameter (e.g., a garment weight; a garment size, a garment SKU) and a resultant garment color may be selected by a user, for example, via a user interface. Accordingly, in order to produce the resultant garment color selected by the user, a processor may determine the extent to which each of the concentrated liquid dyes will be dispensed into the dyeing machine for engagement with the garment. In various embodiments, such an exemplary processor determination may comprise two components: the percentage allocation of the respective concentrated liquid dye colors dispensed into the dyeing machine and the volume of the total collective concentrated liquid dye to be dispensed.

In various embodiments, each of the concentrated liquid dyes may be respectively associated with a concentrated liquid dye color. One or more concentrated liquid dyes may be dispensed at various ratios such that the total collective concentrated liquid dye dispensed into the dyeing machine may comprise a dye input color configured to produce a resultant garment color pre-selected by a user. In various embodiments, the percentage allocation of the respective concentrated liquid dye colors defines the dye input color and affects the shade of the resultant garment color.

Further, in various embodiments, the volume of each of the respective concentrated liquid dyes dispensed (i.e., the amount of the total collective concentrated liquid dye) may be based at least in part on a garment parameter corresponding to the at least one garment in the dyeing machine. In various embodiments, a garment parameter may be a characteristic of a garment and/or (e.g., collective group of garments) that defines, at least in part, the capacity of the garment for absorbing a volume of dyestuff (e.g., the dyestuff absorption capacity of a garment). As non-limiting examples, a garment parameter may be a garment weight and/or a cationic concentration of a garment. For example, in various embodiments, the volume of each of the respective concentrated liquid dyes dispensed (i.e., the amount of the total collective concentrated liquid dye) corresponds to the weight of the garment in the dyeing machine. In various embodiments, a maximum volume of concentrated liquid dye able to be absorbed by a garment may be known to produce a resultant garment color of full depth; that maximum volume defines the maximum volume of concentrated liquid dye that may be dispensed into the system for the garment. In such an exemplary circumstance, the total dispensed volume of concentrated liquid dye that contains an amount of dyestuff is an amount of dyestuff substantially less than or equal to the dyestuff absorption capacity of the garment. In various embodiments, a lesser amount of dye may be injected into the machine in order to affect the depth of the shade of dye input color (i.e., produce, for example, a lighter shade of the dye input color). Accordingly, in various embodiments, the resultant garment color may be a function of both the percentage allocation of the respective concentrated liquid dye colors and the amount of total collective concentrated liquid dye dispensed into the system. Accordingly, in various embodiments, the processor may determine the proportion of each of the concentrated liquid dyes to the total collective concentrated liquid dye dispensed based on the user-selected resultant garment color. Similarly, in various embodiments, the total collective volume of concentrated liquid dye dispensed into the system may vary based at least in part on the user-selected resultant garment color.

Further, in various embodiments, given a selected resultant garment color, the volume of the total collective concentrated liquid dye injected into the dyeing machine—and thus the volume of the individual concentrated liquid dyes injected into the dyeing machine—may be determined solely by the weight of the garment to be dyed. Accordingly, in various embodiments, the processor may determine the volume of the total collective concentrated liquid dye dispensed based on the user-selected garment weight. In such an exemplary method, a processor may determine the volume of each of the concentrated liquid dyes present within the dye injection system to be dispensed based on the user-selected garment weight and desired resultant garment color. For example, the processor may be configured to determine, based at least in part on the user-selected garment weight and desired resultant garment color, the ratio of various dyestuffs that corresponds to the desired resultant garment color and the total amount of dyestuff required to produce the resultant garment color at a full depth of shade. Based at least in part on the known dyestuff concentrations of each of the concentrated liquid dyes, the processor may determine the volume of each of the concentrated liquid dyes to be dispensed such that the calculated amount of dyestuff respectively contained therein, as described above, is dispensed into the dyeing machine.

At block 304, an exemplary method of dyeing a garment may comprise injecting the volume of the one or more concentrated liquid dyes determined by the processor from the dye injection system into the dyeing machine. In various embodiments, the dyeing machine may be at least partially filled with an at least substantially clean solvent. Each volume of concentrated liquid dye may be dispensed from a respective dye cartridge, through a corresponding dispense header, and directly into a dyeing machine. In various embodiments, a garment may be present in the dyeing machine prior to the one or more volumes of concentrated liquid dye being injected.

In various embodiments, the dyeing machine may be, for example, a dyeing vessel, and may be configured to be fluidly connected to one or more holding tanks such that a volume of solvent stored in the one or more holding tanks may be dispensed into the dyeing machine. The concentrated liquid dye and the solvent dispensed into the dyeing machine may define a dyebath. In an exemplary embodiment, the solvent may be, for example, water. Due to the pre-cationization of the garment—which leads to maximized dye exhaustion and the elimination of the need to add salts to the dye—the amount of solvent dispensed into the dyeing machine is not a critical variable to be considered in the exemplary method as disclosed herein. While the amount of solvent dispensed into the dyeing machine may vary based on the volumetric capacity of the dyeing machine, the ratio of concentrated liquid dye to solvent present in the dyebath has no effect on the efficacy of the method disclosed herein.

As noted above, in various embodiments, the one or more volumes of concentrated liquid dye may be dispensed directly into the dyeing machine, may be dispensed into a mixing tank, or may be dispensed into a common delivery conduit.

At block 305, an exemplary method of dyeing a garment may comprise operating the dyeing machine until at least substantially all of the volume of dyestuff present within the one or more concentrated liquid dyes dispensed into the dyeing machine has been absorbed by the garment. The dyeing machine may be configured to encourage interaction between the garment and the dyebath. Further, the dyeing machine may be configured to begin operation after the one or more volumes of concentrated liquid dye have been dispensed into the dyeing machine from the dye injection system. In various embodiments, operating the dyeing machine may comprise executing a dyeing cycle.

In various embodiments, the runtime of a dye cycle may be proportional to at least the weight of the garment in the dyeing machine, the depth of the shade of the resultant garment color, and the exhaustion of the dyestuff in the fabric of the garment. In an exemplary implementation, a dye cycle may comprise a length of time of between 20 and 60 minutes (e.g., between 30 and 45 minutes). Further, in various embodiments, the dyeing machine may be configured maintain the dyebath at a substantially ambient temperature. For example, the dyeing machine may be configured maintain a dyebath temperature of between 10 and 75 degrees Celsius (e.g., between 18 and 40 degrees Celsius) throughout a dye cycle. Such an exemplary method as described herein, may eliminate the need to heat the dyebath to temperatures substantially higher than ambient temperature (e.g., 60 degrees Celsius), thereby drastically reducing the amount of energy consumed during the dyeing process in comparison to traditional dyeing methods.

In various embodiments, the entirety of the volume of dyestuff present in the dyebath at the beginning of the dye cycle may be absorbed by the garment during the dye cycle. In various embodiments, the resultant dyebath may be comprised exclusively of water; there may be no remaining volume of dyestuff, salt, or other forms of effluent present in the dyebath. Alternatively, in various embodiments, there might be a substantially small volume of dyestuff and/or one or more components contained within the concentrated liquid dye remaining in the dyebath at the end of a dyeing cycle. For example, in various embodiments, the resultant dyebath may be free of additives conventionally used to enhance the percentage of dye uptake in the dyeing process as a result of dispensing a calibrated volume of concentrated liquid dye, as described herein. In various embodiments, the garment may be subsequently washed and/or dried after the dye cycle has concluded. The garment may be subsequently washed and/or dried using either the dyeing machine or any other suitable machine configured to wash and/or dry the garment as described herein.

At block 306 an exemplary method of dyeing a garment may comprise filtering the dyebath so as to remove the entirety of a residual volume of dyestuff. In various embodiments, after a dyeing cycle has ended, the dyebath may be filtered such that any volume of dyestuff remaining in the dyebath may be removed, effectively leaving a substantially clean water that may be suitable for reuse in the dyeing process. In various embodiments, filtering the dyebath may comprise exposing the dyebath to a filtration system. For example, filtering the dyebath may comprise loading a dyeing machine or other vessel to which the dyebath has been transferred (e.g., a filtration system reservoir) with a supplemental material that has been treated to absorb the entirety of residual volume of dyestuff. In various embodiments, the supplemental material may be cationized, and may comprise excess fabric, fiber, yarn, cotton, or other garment portions. In various embodiments, the supplemental material may, for example, be sewn into a polypropylene container (i.e., a "tea-bag") which may be placed into the dyebath such that the entirety of the residual volume of dyestuff present in the dyebath may be absorbed by the supplemental fabric. Alternatively, in various embodiments, the filtration system may comprise a vessel with one or more strainers configured to remove the entirety of the residual volume of dyestuff from the dyebath.

At block 307 an exemplary method of dyeing a garment may comprise recirculating the volume of at least substantially clean solvent for reuse in a subsequent dye cycle. In various embodiments, the volume of at least substantially clean solvent may comprise a volume of clean water. In various exemplary embodiments, the volume of water may be transferred directly from either the dyeing machine or the filtration system to one or more holding tanks for storage. The holding tanks, for example, may comprise a plurality of reservoirs in fluid communication with the dyeing machine and/or the filtration system. The holding tanks may be configured to receive a volume of at least substantially clean solvent from either the dyeing machine and/or the filtration system and may be configured to send a volume of solvent back to the dyeing machine before a new dye cycle begins. Alternatively, in various embodiments, the volume of water may be transferred directly from the filtration system back into the dyeing machine for reuse with the subsequent dye cycle. As described herein, an exemplary method comprises a substantially closed-loop system with respect to the solvent.

In various applications, an exemplary method as disclosed herein may be implemented in, for example, either a retail or manufacturing setting.

It is to be understood that the present invention is not limited to the embodiments described above and illustrated in the drawings; rather, the skilled person will recognize that many changes and modifications may be made within the scope of the disclosed invention. For example, it should be understood that while the exemplary embodiments described above are directed to dyeing a garment, the method and apparatus embodiments disclosed herein may be configured to dye a weight (or mass) of material other than a garment, such as, for example, garment thread, yarn, woven sheets, any colorable fabric, or any other dye absorbent material.

Dyestuff and Concentrated Liquid Dye Composition

In various embodiments, the method and apparatus for dyeing garments disclosed herein may utilize a volume of dyestuff to color a garment. Dyestuff, as described herein, may be a powder, for example, and may comprise a composition of soluble substances that collectively may be associated with a particular color. In various embodiments, a volume of dyestuff may be mixed with water to create a concentrated liquid dye, which may be associated with the same color as the volume of dyestuff contained therein. The volume of water may be sufficiently mixed with the dyestuff for the purpose of facilitating the injection of the dyestuff into a dyeing machine. Upon being injected into the dyeing machine, the concentrated liquid dye may interact with a volume of solvent present in the dyeing machine, thereby creating a dyebath. As described herein, a garment may be sufficiently submerged within the dyebath such that it may absorb at least substantially all of the volume of dyestuff that—in the form of concentrated liquid dye—was injected into the dyebath.

In various embodiments, the dyestuff as described herein may be a reactive dye. Further, in various embodiments, the dyestuff may be any direct dye or acid dye suitable for use with the apparatus and method described herein.

The exemplary method and apparatus described above may, in various embodiments, include using a dyestuff consisting exclusively of chromophore. For example, an exemplary volume of dyestuff may not contain additive dyeing enhancement agents such as, for example, cutting agents (e.g., potato starch), added salt content, water-emulsifiable dedusting oils, and/or the like.

Accordingly, the concentrated liquid dye used in various embodiments may consist only of water and chromophore. Critically, the exemplary methods and apparatuses disclosed herein may be configured to utilize a concentrated liquid dye that does not contain many of the additives conventionally used to enhance the percentage of dye uptake in the dyeing process, such as, for example, various added salt content (e.g., Sodium Chloride, Sodium Sulphate), alkaline content (e.g., Sodium Hydroxide, Sodium Carbonate), or other contaminant. In various embodiments, an exemplary volume of concentrated liquid dye may include one or more preservatives configured to expand the useful lifespan of the concentrated liquid dye, such as, for example, Sodium Tripolyphosphate, and/or an antimicrobial agent.

Further, it should be understood that in various embodiments, the dyestuff concentration within the concentrated liquid dye (i.e., the ratio of dyestuff to water in the concentrated liquid dye) may have little to no effect on the efficacy of the dyeing process. In various embodiments, the sole variable critical to the dyeing of the garment may be the volume of dyestuff dispensed into the dyeing machine; the additional solvent added to the dyestuff to facilitate injection, once injected, may simply become subsumed into the larger volume of solvent already present in the dyebath. While the volume of dyestuff in the dyebath may interact with the garment in the dyeing machine, the volume of solvent present within the concentrated liquid dye may become a passive component of the dyebath.

Method of Dyeing a Patterned Garment

Figure 4:
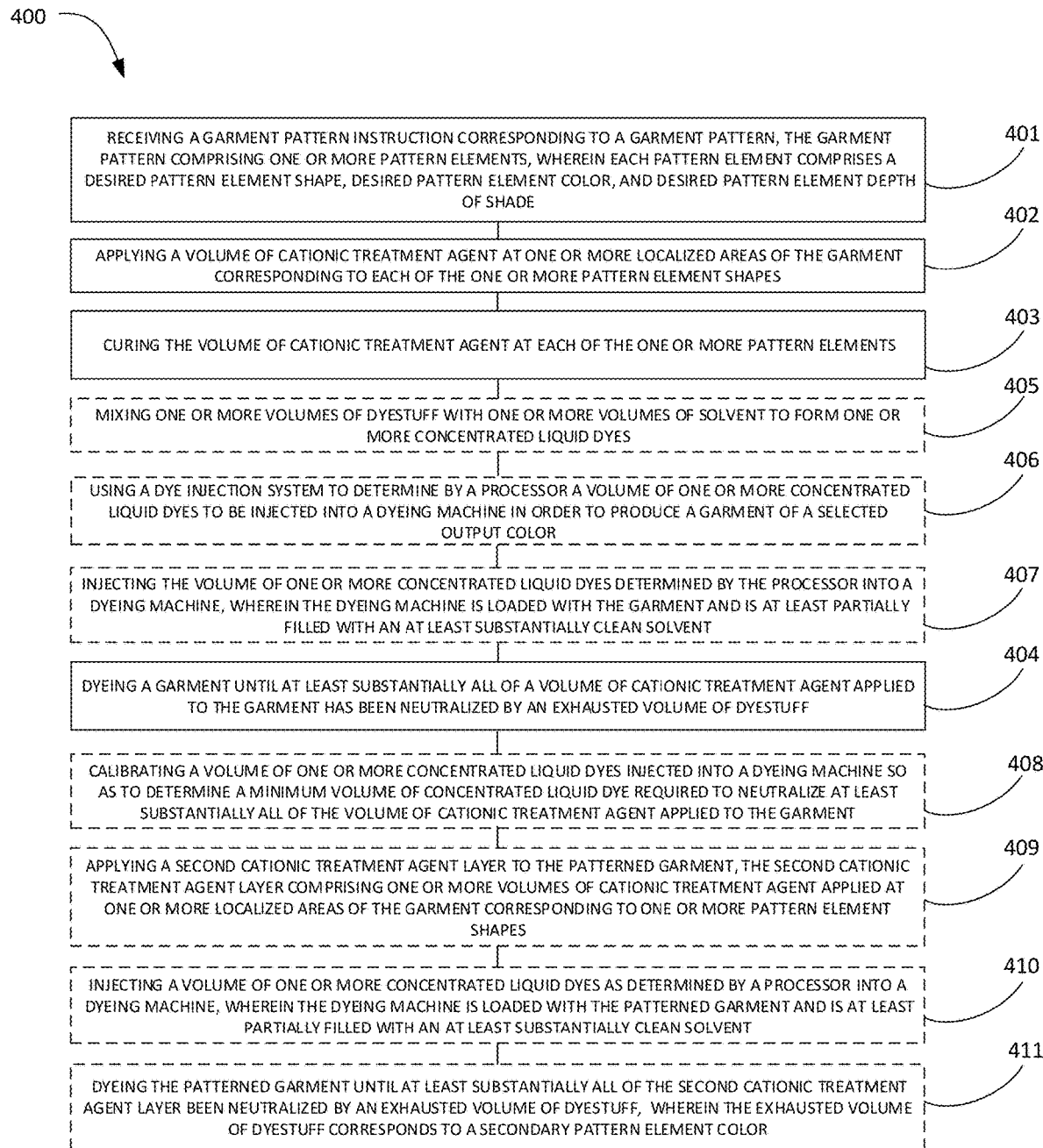
FIG. 4 illustrates a flow diagram of an exemplary method of cationizing a garment in accordance with some example embodiments described herein.

FIG. 4 illustrates a flow diagram of an example method 400 in accordance with various embodiments discussed herein.

At block 401, an exemplary method of dyeing a patterned garment may comprise receiving a garment pattern instruction corresponding to a garment pattern. In various embodiments, the garment pattern may comprise one or more pattern elements, wherein each pattern element comprises a pattern element shape, pattern element color, and pattern element depth of shade. Garment pattern instructions may comprise a detailed description and/or one or more commands (e.g., computer instructions) corresponding to various attributes of a garment pattern. In various embodiments, the garment pattern instructions may be provided via user input from a user in either a retail or manufacturing setting.

Each of the one or more pattern elements may be defined by a plurality of pattern element characteristics, such as, for example, pattern element shape, pattern element color, and pattern element depth of shade. As described herein, pattern element shape may be defined by both the configuration of the outer boundary of a pattern element, as well as the location of the pattern element on the garment. Pattern element color may be defined as the output color of a garment at a particular pattern element. Further, the pattern element depth of shade may be defined as a relative lightness of a pattern element color. For example, a pattern element depth of shade of full depth, or 100%, may define the pattern element color as selected by a user, while pattern elements with decreasing depths of shade will appear increasingly fainter (i.e., lighter, assuming a garment of a white base color). In various embodiments, depth of shade at a particular garment area may be affected by three depth of shade input variables: the volume of dyestuff (i.e., concentrated liquid dye) used in a dye cycle, the dye cycle runtime, and the concentration of cationic treatment agent applied at the garment area ("cationic concentration"). Accordingly, as described herein, one or more of the aforementioned depth of shade input variables may be selectively varied, alone or in combination, to achieve a desired pattern element depth of shade.

At block 402, an exemplary method of dyeing a patterned garment may comprise applying a volume of cationic treatment agent at one or more localized garment areas of a garment corresponding to each of the one or more pattern element shapes. In various embodiments, a volume of cationic treatment agent may be applied to a garment as part of a cationization process. As may be generally understood, cationization may comprise a pretreatment process wherein the cellulosic macromolecules of a cotton garment may be chemically modified in order to introduce a positive charge within at least a portion of the garment. Cationization creates an electrostatic interaction between the positive charges on the cotton fiber and the negative charges on the anionic dye, effectively increasing the cotton's affinity for the anionic dye. A garment may be cationized by applying a cationic treatment agent to the garment.

As described herein, particular garment areas defining less than an entire garment may be cationized by selectively applying a volume of cationic treatment agent to the particular garment area. A volume of cationic treatment agent may be applied to one or more garment areas corresponding to the respective pattern element shapes of each of the one or more pattern elements. For example, the volume of cationic treatment agent may be applied so as to one or more garment areas comprising shapes, letters, numbers, or any combination thereof. Further, in various embodiments, the volume of cationic treatment agent may be applied across a garment area in either progressively increasing or progressively decreasing cationic concentration such that when the garment is dyed, as described herein, at least part of the garment pattern exhibits a gradient effect rather than a discrete change in color or depth of shade. As described herein, the gradient effect would be the result of the progressive change in the pattern element depth of shade corresponding to a gradient cationic concentration at that garment area. The cationic treatment agent may be applied in any state that allows for the cationic treatment agent to penetrate the fibers of the garment, such as, for example, a spray, a liquid, and/or or a gel.

In various embodiments, cationic treatment agent may be selectively applied to a garment using various application apparatuses and methods, such as, for example, screen printing, manual spraying (e.g., hand spraying), automated spraying (e.g., inkjet printing), and/or the like. In various embodiments, the cationic treatment agent may comprise 3-chloro-2-hydroxypropyltrimethylammonium chloride (CHPTAC). As just one example, the cationic treatment agent may comprise Dow ECOFAST™ Pure Sustainable Textile Treatment.

As described herein, any given volume of cationic treatment agent contains an electronic charge. The collective electric charge of a particular volume of cationic treatment agent may be proportional to the amount of cationic treatment agent within the particular volume (i.e., volume size). Accordingly, the smaller the garment area over which a particular volume of cationic treatment agent is dispersed, the more concentrated the volume of cationic treatment agent will be, and the higher the electrical charge of the garment will be over that garment area. As described herein, prior to reaching its threshold of dyestuff absorption (i.e., saturation point), a cationized garment area will continue to absorb dyestuff from a dyebath either until all of the dyestuff has been exhausted from the dyebath, or for as long as the garment area maintains an electrical charge. Thus, in various embodiments, the higher the cationic concentration of a particular cationized garment area, the more dyestuff the particular garment area will retain, thereby increasing the depth of shade at that particular cationized garment area. Accordingly, a concentration of cationic treatment agent applied to a pattern element may be selectively varied to affect the depth of shade of a pattern element.

At block 403, an exemplary method of dyeing a patterned garment may comprise curing the volume of cationic treatment agent at each of the one or more pattern elements. As is generally known, a garment may be cured upon cationization in order to solidify the settlement of a volume of cationic treat in a particular location on a garment, so as to avoid migration or runoff. In various embodiments, curing at least a portion of a garment may comprise one or more known curing processes, such as pad-dry curing, pad-flash curing, drip dry curing, and/or the like.

At block 404, an exemplary method of dyeing a patterned garment may comprise dyeing a garment until at least substantially all of a volume of cationic treatment agent applied to the garment has been neutralized by an exhausted volume of dyestuff, wherein the dyeing machine is configured to encourage interaction between the garment and a dyebath. In various embodiments, a dyeing machine, as described herein, may be configured to execute at least a portion of the dyeing operation. In such circumstances, the dyeing machine encourages interaction between the garment and the dyebath. The dyestuff utilized in the dyeing operation may correspond to the garment pattern output color and/or the pattern element color of the one or more pattern elements, as selected by the user. In various embodiments, operating the dyeing machine may comprise executing a dyeing cycle.

In various embodiments, as described herein, a concentrated liquid dye utilized during the dyeing operation may be void of any salts or other alkali materials such that the concentrated neutral charge may itself comprise an electrical charge. Further, due at least in part to the cationization process as described herein, the dye cycle may be executed at a substantially ambient temperature, which may be known to negatively affect the uptake of dyestuff by an untreated garment. As such, at least substantially all of a volume of dyestuff absorbed by a garment may be absorbed by the one or more pattern elements of the garment to which the cationic treatment agent was applied. The cationized garment areas defined by the one or more pattern element shapes may continue to absorb dyestuff until their respective electric charge has been neutralized. Accordingly, a neutral garment area without an electric charge, such as, for example, an untreated (i.e., non-cationized) garment area or a garment area that has absorbed a volume of dyestuff such that it has become neutralized, may absorb a relatively insignificant amount of dyestuff (i.e., little to no dyestuff) in comparison to the one or more cationized pattern elements of the garment. Untreated garment areas may at least substantially maintain the original color of the un-dyed garment throughout the dyeing operation. Upon neutralization of each of the one or more pattern areas, the one or more pattern elements of the garment pattern may each exhibit a pattern element color corresponding to the color of the volume of dyestuff used in the dyeing operation and a pattern element depth of shade that is at least substantially proportional to the respective cationic concentration of the pattern element, as described herein. The variance in color and depth of shade between untreated garment areas and the one or more pattern elements, as well as the variance in depth of shade amongst the one or more pattern elements, as described herein, creates an overall garment aesthetic which may define the garment pattern.

In various embodiments, the runtime of a dye cycle may be proportional to the weight of the garment in the dyeing machine, the desired depth of the shade of the resultant garment color, the volume of cationic treatment agent applied to the garment, and/or the exhaustion of the dyestuff in the fabric of the garment. In an exemplary implementation, a dye cycle may comprise a length of time of between 20 and 60 minutes (e.g., between 30 and 45 minutes). Further, in various embodiments, the dyeing machine may be configured maintain the dyebath at a substantially ambient temperature. For example, the dyeing machine may be configured maintain a dyebath temperature of between 10 and 75 degrees Celsius (e.g., between 18 and 40 degrees Celsius) throughout a dye cycle. Such an exemplary method as described herein, may eliminate the need to heat the dyebath to temperatures substantially higher than ambient temperature (e.g., 60 degrees Celsius), thereby drastically reducing the amount of energy consumed during the dyeing process in comparison to traditional dyeing methods.

In various embodiments, the runtime of a dye cycle may be selectively shortened so as to affect the pattern element depth of shade of the one or more pattern elements. As a non-limiting example, an exemplary dye cycle may comprise a length of time of approximately 35 minutes and may utilize a volume of dyestuff sufficient to provide one or more pattern elements with a full pattern element depth of shade to dye a garment. The 35-minute dye cycle runtime may define a length of time sufficient to allow the entirety of a volume of dyestuff present in a dyebath at the beginning of the dye cycle to be absorbed by the one or more pattern elements of the garment. In such a circumstance, the one or more pattern elements may comprise a full pattern element depth of shade. Further, in various embodiments, the runtime of a dye cycle may be selectively shortened such that the one or more pattern elements comprise a lesser (i.e., lighter) pattern element depth of shade. Using the same non-limiting example described above, if the dye cycle were stopped after a 25-minute runtime, the one or more pattern elements would comprise a pattern element depth of shade that is lighter than that of the one or more pattern elements exposed to a 35-minute runtime. Further, if the dye cycle were stopped after a 15-minute runtime, the one or more pattern elements would comprise a pattern element depth of shade that is lighter than that of the one or more pattern elements exposed to a 25-minute runtime. Accordingly, as described herein, the runtime of a dye cycle may be a depth of shade input variable that may be calibrated to achieve a desired pattern element depth of shade.

Figure 10:
FIG. 10 shows various experimental exemplary garment portions dyed in accordance with some example embodiments described herein.

As a further example, FIG. 10 shows six different garment portions that were each subjected to an experimental dyeing process, the six different garment portions being representative of six different garments and/or six different pattern elements within the respective garments. Each of the garment portion was subjected to a substantially identical dye process, wherein each of the garment portions comprised an identical cationic concentration and an identical volume of dyestuff was injected into a dyeing machine for each of the respective dye cycles. However, the dye cycle runtime for each of the six experimental dye cycles was varied. The table below provides the respective dye cycle runtimes associated with each of the six garment portions:

| Garment Portion 1001 | 10 minutes |
| Garment Portion 1002 | 5 minutes |
| Garment Portion 1003 | 3 minutes |
| Garment Portion 1004 | 1 minutes |
| Garment Portion 1005 | 30 seconds |
| Garment Portion 1006 | 15 seconds |

As shown in FIG. 10, garment portion 1001, which was exposed to the volume of dyestuff for the greatest amount of time, comprises the fullest depth of shade when compared to the five other garment elements. Conversely, garment portion 1006, which was exposed to the volume of dyestuff for the least amount of time, comprises the least full (i.e., lightest) depth of shade when compared to the five other garment elements. Further, each of the garment portions comprising an intermediate depth of shade 1002, 1003, 1004, 1005 exhibits a different depth of shade relatively corresponding to the runtime of its respective dye cycle.

Returning to the description of the exemplary embodiment depicted in FIG. 4, in various embodiments, the entirety of the volume of dyestuff present in the dyebath at the beginning of the dye cycle may be absorbed by the garment during the dye cycle. Accordingly, the volume of dyestuff utilized in the dyeing operation may be selectively reduced so as to affect the pattern element depth of shade of the one or more pattern elements. As a non-limiting example, an exemplary dyeing operation may comprise using three liters of concentrated liquid dye to dye a garment. In such a circumstance, the entirety of the volume of dyestuff present in a dyebath at the beginning of a dye cycle may be absorbed by the one or more pattern elements of the garment. Further, the volume of dyestuff present within the three liters of concentrated liquid dye may provide the one or more pattern elements with a full pattern element depth of shade. Further, in various embodiments, the volume of dyestuff utilized in the dyeing operation may be selectively reduced such that the one or more pattern elements comprise a lesser (i.e., lighter) pattern element depth of shade. Using the same non-limiting example described above, if two liters of concentrated liquid dye were utilized to dye the garment, the one or more pattern elements would comprise a pattern element depth of shade that is lighter than that of the one or more pattern elements exposed to the volume of dyestuff present within the three liters of concentrated liquid dye. Further, if only one liter of concentrated liquid dye were utilized to dye the garment, the one or more pattern elements would comprise a pattern element depth of shade that is lighter than that of the one or more pattern elements exposed to the volume of dyestuff present within the two liters of concentrated liquid dye. Accordingly, as described herein, the volume of dyestuff utilized in the dyeing operation may be a depth of shade input variable that may be calibrated to achieve a desired pattern element depth of shade.

As described herein, in an exemplary embodiment wherein the entirety of the volume of dyestuff present in the dyebath at the beginning of the dye cycle may be absorbed by the garment during the dye cycle, the resultant dyebath may be comprised exclusively of water; there may be no remaining volume of dyestuff, salt, or other forms of effluent present in the dyebath. Alternatively, in various embodiments, there might be a substantially small volume of dyestuff and/or one or more components contained within the concentrated liquid dye remaining in the dyebath at the end of a dyeing cycle. For example, in various embodiments, the resultant dyebath may be free of additives conventionally used to enhance the percentage of dye uptake in the dyeing process as a result of dispensing a calibrated volume of concentrated liquid dye, as described herein. In various embodiments, the garment may be subsequently washed and/or dried after the dye cycle has concluded. The garment may be subsequently washed and/or dried using either the dyeing machine or any other suitable machine configured to wash and/or dry the garment as described herein.

It should be understood that in various embodiments, a method for dyeing a patterned garment may comprise, in part or in whole, a method for dyeing garments as described herein, and may utilize an apparatus for dyeing garments as described herein. Further, it should be understood that any dyeing technique, process, and/or apparatus operable in conjunction with one or more of the exemplary embodiments of the method for dyeing a patterned garment described herein may be utilized.

At block 405, an exemplary method of dyeing a patterned garment may further comprise mixing one or more volumes of dyestuff with one or more volumes of solvent to form one or more concentrated liquid dyes. In various embodiments, the concentrated liquid dye may comprise a mixture of a volume of dyestuff and a volume of water. The volume of water may be sufficiently mixed with the dyestuff such that the dyestuff is maintained in a state of suspension so as to facilitate dispensing of the dyestuff into the dyeing machine as a concentrated liquid dye. In various embodiments, the concentrated liquid dye may comprise a water to dyestuff ratio of between 2:1 and 50:1 (e.g., 3:1 to 8:1). In various embodiments, an additive such as, for example, a gel may be added to the liquid concentrated dye to further facilitate a state of suspension; any additive introduced into the concentrated liquid dye will not affect the percentage of dye uptake in the dyeing process.

In various embodiments, the mixing of a volume of dyestuff and a volume of solvent to create a concentrated liquid dye may be repeated with one or more volumes of dyestuff, each associated with a distinct color. The resulting concentrated liquid dyes may each be associated with a distinct color correlating to the color of their respective volume of dyestuff. In various embodiments, the one or more concentrated liquid dyes may define an array of between 1 and 20 colors (e.g., between 7 and 12 colors) that may be selectively combined in various proportions, thus enabling a large number of available resultant pattern colors, as described herein.

In various embodiments, the one or more concentrated liquid dyes may be respectively stored in cartridges. The concentrated liquid dye cartridges may be disposed within a dye housing. In various embodiments, each of the one or more the concentrated liquid dye cartridges may be configured to be fluidly connected to a respective dispense header such that various proportions of the concentrated liquid dye may be injected through a dispense header into a dyeing machine, mixing tank, or delivery conduit.

At block 406, an exemplary method of dyeing a patterned garment may further comprise using a dye injection system to determine by a processor a volume of one or more concentrated liquid dyes to be injected into a dyeing machine in order to produce a garment of a selected output color. In various embodiments, as described above, a garment weight and a pattern color may be selected by a user via a user interface. Accordingly, in order to produce the resultant pattern element color selected by the user, a processor may determine the extent to which each of the concentrated liquid dyes will be dispensed into the dyeing machine for engagement with the garment. In various embodiments, such an exemplary processor determination may comprise two components: the percentage allocation of the respective concentrated liquid dye colors dispensed into the dyeing machine and the volume of the total collective concentrated liquid dye to be dispensed.

In various embodiments, each of the concentrated liquid dyes may be respectively associated with a concentrated liquid dye color. One or more concentrated liquid dyes may be dispensed at various ratios such that the total collective concentrated liquid dye dispensed into the dyeing machine may comprise a dye input color configured to produce a resultant garment color pre-selected by a user. In various embodiments, the percentage allocation of the respective concentrated liquid dye colors defines the dye input color and affects the resultant garment color.

Further, in various embodiments the volume of each of the respective concentrated liquid dyes dispensed (i.e., the amount of the total collective concentrated liquid dye) may correspond to the weight of the garment in the dyeing machine. In various embodiments, a maximum volume of dyestuff able to be absorbed by a garment may be known to produce a resultant garment color of full depth; that maximum volume defines the maximum volume of concentrated liquid dye that may be dispensed into the system for the garment. In various embodiments, a lesser amount of dye may be injected into the machine in order to affect the depth of the shade of dye input color (i.e., produce, for example, a lighter shade of the dye input color). Accordingly, in various embodiments, the resultant garment color may be a function of both the percentage allocation of the respective concentrated liquid dye colors and the amount of concentrated liquid dye dispensed into the system. Accordingly, in various embodiments, the processor may determine the proportion of each of the concentrated liquid dyes to the total collective concentrated liquid dye dispensed based on the user-selected resultant garment color.

Further, in various embodiments, the volume of each of the respective concentrated liquid dyes dispensed (i.e., the amount of the total collective concentrated liquid dye) may be further calibrated to account for the fact that the dyestuff may only be absorbed by garment areas corresponding to the one or more pattern element shapes of the one or more pattern elements, which may define less than the entire garment. In such a circumstance, the amount of the total collective concentrated liquid dye may be proportionally reduced to correspond to the weight of the one or more garment areas corresponding to the one or more pattern elements.

Further, in various embodiments, the volume of each of the respective concentrated liquid dyes dispensed (i.e., the amount of the total collective concentrated liquid dye) may be further calibrated based on the capacity of the one or more pattern elements to absorb dyestuff. For example, the amount of the total collective concentrated liquid dye—which should be understood to comprise a volume of dyestuff, as described herein—may be calibrated to be dispensed in proportion to the dyestuff absorption capacity of a garment, defined, at least in part, by the volume of cationic treatment agent applied to the garment. In such a circumstance, the amount of the total collective concentrated liquid dye may be reduced to accommodate a cationic concentration of one or more of the one or more pattern elements that is less than full capacity (i.e., a cationic concentration that chemically creates an absorption threshold that is lower than a garment area is physically capable of absorbing).

In various embodiments, given a selected resultant garment color, the volume of the total collected concentrated liquid dye injected into the dyeing machine—and thus the volume of the individual concentrated liquid dyes injected into the dyeing machine—may be determined solely by the weight of the garment to be dyed. Accordingly, in various embodiments, the processor may determine the volume of the total collective concentrated liquid dye dispensed based on the user-selected garment weight. In such an exemplary method, a processor may determine the volume of each of the concentrated liquid dyes present within the dye injection system to be dispensed based on the user-selected garment weight and resultant garment color.

At block 407, an exemplary method of dyeing a patterned garment may further comprise injecting the volume of one or more concentrated liquid dyes determined by the processor into a dyeing machine, wherein the dyeing machine is loaded with the garment and is at least partially filled with an at least substantially clean solvent. Each volume of concentrated liquid dye may be dispensed from a respective dye cartridge, through a corresponding dispense header, and directly into a dyeing machine. In various embodiments, a garment may be present in the dyeing machine prior to the one or more volumes of concentrated liquid dye being injected.

In various embodiments, a dyeing machine may be, for example, a dyeing vessel, and may be configured to be fluidly connected to one or more holding tanks such that a volume of solvent stored in the one or more holding tanks may be dispensed into the dyeing machine. The concentrated liquid dye and the solvent dispensed into the dyeing machine may define a dyebath. In an exemplary embodiment, the solvent may be, for example, water. In various embodiments, due to the pre-cationization of the garment—which leads to maximized dye exhaustion and the elimination of the need to add salts to the dye—the amount of solvent dispensed into the dyeing machine is not a critical variable to be considered in the exemplary method as disclosed herein. While the amount of solvent dispensed into the dyeing machine may vary based on the volumetric capacity of the dyeing machine, the ratio of concentrated liquid dye and/or dyestuff to solvent present in the dyebath has no effect on the efficacy of the method disclosed herein.

As noted above, in various embodiments, the one or more volumes of concentrated liquid dye may be dispensed directly into the dyeing machine, may be dispensed into a mixing tank, or may be dispensed into a common delivery conduit.

At block 408, an exemplary method of dyeing a patterned garment may further comprise calibrating a volume of one or more concentrated liquid dyes injected into a dyeing machine so as to determine a minimum volume of concentrated liquid dye required to neutralize substantially all of the volume of cationic treatment applied to a particular garment design (e.g., a garment with one or more pattern elements each comprising a pattern element depth of shade corresponding to a cationic concentration). In various embodiments, calibrating the volume of concentrated liquid dye injected into a dyeing machine for such a garment may comprise completing a first dyeing operation, dispensing the resultant dyebath containing the resultant volume of dyestuff, and repeating the dyeing operation with a different volume of concentrated liquid dye (e.g., with a lesser volume of injected concentrated liquid dye if the resultant dyebath in the first operation contains excess dyestuff, or with a greater volume of injected concentrated liquid dye if the resultant dyebath in the first operation does not contain excess dyestuff). The calibration process may comprise an empirical modification of the volume of concentrated liquid dye that is iteratively repeated until a volume of concentrated liquid dye is injected into a dyeing machine wherein at least substantially all of the injected volume of dyestuff neutralizes at least substantially all of the volume of cationic treatment agent applied to the garment.

As will be appreciated from the description herein, this calibration process assists in efficiently dyeing garments with complex pattern elements. As a result of calibration, the resultant dyebath consists of a substantially clean volume of solvent suitable for reuse. In various embodiments in which reproduction of a patterned garment of a particular weight and a particular garment pattern may be desirable, calibrating the volume of concentrated liquid dye injected into a dyeing machine may increase the efficiency of the dyeing process.

Upon dyeing a garment until at least substantially all of a volume of cationic treatment agent applied to the garment has been neutralized by an exhausted volume of dyestuff, an exemplary method of dyeing a patterned garment may further comprise, at block 409, applying a second cationic treatment agent layer to the patterned garment. In various embodiments, a garment pattern may comprise one or more pattern element sets, such as, for example, primary pattern elements, and secondary pattern elements. Each respective pattern element set subsequent to the one or more primary pattern elements may correspond to one or more subsequent operations which mirror those described above with respect to blocks 402, 403, and 404, as described herein.

In various embodiments, a second cationic treatment agent layer may comprise one or more volumes of cationic treatment agent applied at one or more localized areas of the garment corresponding to each of the pattern element shapes of one or more secondary pattern elements. In various embodiments, each of the one or more secondary pattern elements may vary in pattern element shape, pattern element color, and/or pattern element depth of shade from the one or more pattern elements previously exposed to the dyeing operation (i.e., the "primary pattern elements"), as described above. As was described above with respect to the one or more primary pattern elements at block 402, a volume of cationic treatment agent may be applied to one or more garment areas corresponding to the respective pattern element shapes of each of the one or more pattern elements. In various embodiments, the pattern element shapes of the one or more secondary pattern elements may correspond to previously untreated garment areas (i.e., those which maintained the original garment color throughout the dyeing operation described above), or may overlap, in whole or in part, one or more of the one or more primary pattern elements. Applying the second cationic treatment agent layer at a garment area wherein a secondary pattern element overlaps a primary element may effectively re-charge the garment area, so as to affect the garment's capacity for dyestuff absorption at that area.

At block 410, an exemplary method of dyeing a patterned garment may further comprise injecting a volume of one or more concentrated liquid dyes as determined by a processor into a dyeing machine, wherein the dyeing machine is loaded with the patterned garment and is at least partially filled with an at least substantially clean solvent. As was described above with respect to the one or more primary pattern elements at block 407, each volume of concentrated liquid dye may be dispensed from a respective dye cartridge, through a corresponding dispense header, and directly into a dyeing machine. In various embodiments, the patterned garment may be present in the dyeing machine prior to the one or more volumes of concentrated liquid dye being injected.

In various embodiments, a processor may determine the extent to which each of the concentrated liquid dyes will be dispensed into the dyeing machine in order to produce a pattern element color of the one of more secondary pattern elements as selected by the user. In various embodiments, the pattern element color of the one or more secondary elements may different than the pattern color of the one or more primary pattern elements. In such a circumstance, where a secondary pattern element overlaps a primary pattern element, the resultant garment pattern color at that location on the patterned garment may comprise a combination of the pattern colors of the primary and secondary pattern elements. In various embodiments, as described herein, such an exemplary processor determination may comprise two components: the percentage allocation of the respective concentrated liquid dye colors dispensed into the dyeing machine and the volume of the total collective concentrated liquid dye to be dispensed.

At block 411, an exemplary method of dyeing a patterned garment may further comprise dyeing the patterned garment until at least substantially all of the second cationic treatment agent layer has been neutralized by an exhausted volume of dyestuff. As was described above with respect to the one or more primary pattern elements at block 404, at least substantially all of a volume of dyestuff absorbed by the patterned garment may be absorbed by the one or more secondary pattern elements of the garment to which the second cationic treatment agent layer was applied. The cationized garment areas defined by the pattern element shapes of the one or more secondary pattern elements may continue to absorb dyestuff until their respective electric charge has been neutralized. Accordingly, a neutral garment area without an electric charge, such as, for example, an untreated (i.e., non-cationized) garment area or a garment area that has absorbed a volume of dyestuff such that it has become neutralized, may absorb a relatively insignificant amount of dyestuff (i.e., little to no dyestuff) in comparison to the one or more cationized secondary pattern elements of the garment. Untreated garment areas, as well as those garment areas corresponding to the, now neutralized, one or more primary pattern elements, may at least substantially maintain the color which they exhibited prior to the second dye cycle (i.e., the original, un-dyed garment color and the pattern element color of the one or more primary pattern elements) throughout the second dyeing operation. Upon neutralization of each of the garment areas cationized by the second cationic treatment agent layer, the one or more secondary pattern elements of the garment pattern may each exhibit a pattern element color corresponding, at least in part, to the color of the volume of dyestuff used in the second dyeing operation and a pattern element depth of shade that is at least substantially proportional to the respective cationic concentration of the secondary pattern element, as described herein. The variance in color and depth of shade between untreated garment areas, the one or more primary pattern elements, and the one or more secondary pattern elements, as well as the variance amongst each of the respective sets of pattern elements, as described herein, creates an overall garment aesthetic which may define the garment pattern of the patterned garment.

In various embodiments, the patterned garment may be subsequently washed and/or dried after the second dye cycle has concluded. The garment may be subsequently washed and/or dried using either the dyeing machine or any other suitable machine configured to wash and/or dry the garment as described herein.

Exemplary Operations

FIGS. 5A-9 illustrate various exemplary patterned garments produced in accordance with various exemplary methods as discussed herein. It should be understood that the various exemplary patterned garments illustrated in FIGS. 5A-9 are disclosed herein as exemplary products of one or more methods for dyeing a patterned garment as disclosed herein; they are in no way intended to act limiting examples or represent the full breadth of patterned garment configurations that may be produced by the present invention.

In various embodiments, a garment pattern instruction may be received which corresponds to a garment pattern. The garment pattern may comprise one or more pattern elements, each of which may comprise a desired pattern element shape, desired pattern element color, and desired pattern element depth of shade. The garment pattern may comprise one or more sets of pattern elements, each set of pattern elements comprising one or more pattern elements. In various embodiments, the garment pattern may comprise an enterprise-designed pattern, a customized pattern designed by a user (e.g., an enterprise customer), or a combination of the two.

i. First Exemplary Operation

In various embodiments, a volume of cationic treatment agent may be applied at one or more localized areas of a garment corresponding to each of the one or more pattern element shapes of the one or more pattern elements.

Figure 5B:
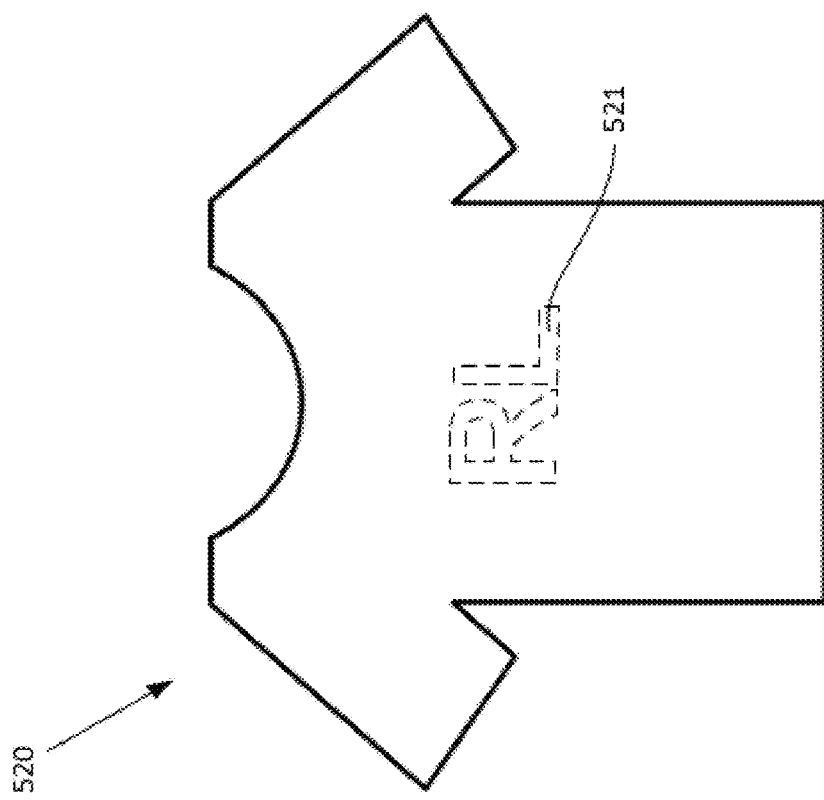
FIGS. 5a-5b illustrate an exemplary garment cationized in accordance with some example embodiments described herein.
Figure 5A:
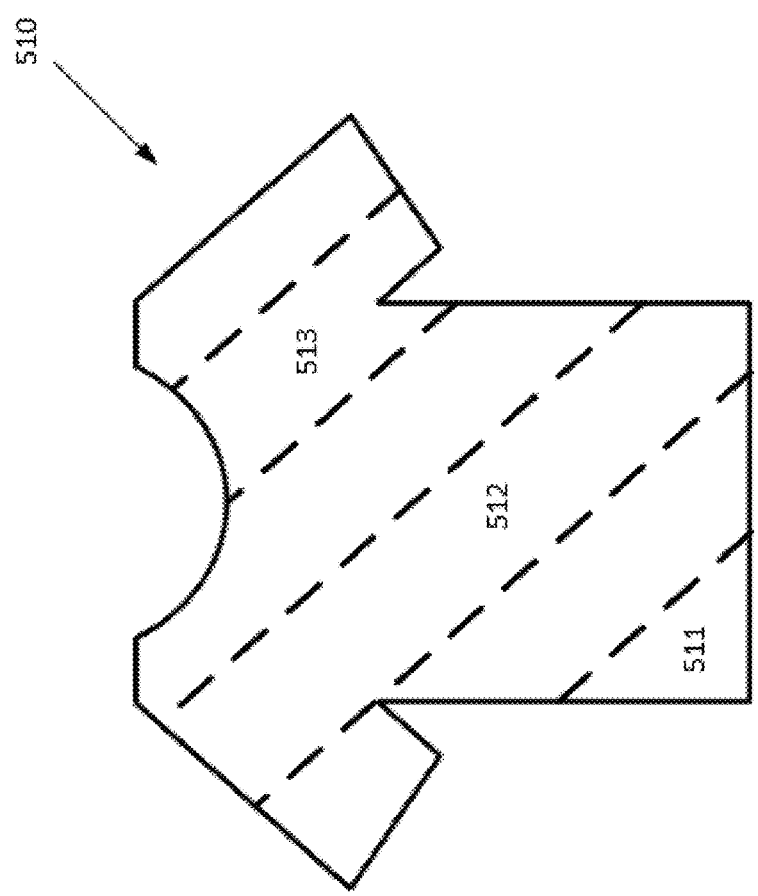

As illustrated in FIG. 5A, garment pattern instructions may be received which correspond to first garment pattern 510. As shown, the first garment pattern 510 comprises a first pattern element 511, a second pattern element 512, and a third pattern element 513. The first, second, and third pattern elements may comprise a first pattern element shape, a second pattern element shape, and a third pattern element shape, respectively. In various embodiments, a volume of cationic treatment agent may be applied at a first cationic garment area 511, a second cationic garment area 512, and a third cationic garment area 513, which may correspond, respectively, to the first, second, and third pattern element shapes. In various embodiments, the volume of cationic treatment agent applied to each of the cationized garment areas 511, 512, 513 may be sufficiently large so as to enable a level of dyestuff absorption that produces a full pattern element depth of shade. Further, in various embodiments, the cationic concentration of each of the cationized garment areas 511, 512, 513 may be selectively varied, as described herein, to affect the respective pattern element depths of shade of the first, second, and third pattern elements. As non-limiting examples, the first garment pattern 510 may comprise shapes, letters, numbers, images, graphics, and/or the like, as well as any combination thereof.

As illustrated in FIG. 5B, garment pattern instructions may be received which correspond to a second garment pattern 520. As shown, the second garment pattern 520 comprises a pattern element 521, which comprises a pattern element shape. In the illustrated embodiment of FIG. 5B, the pattern element shape is a graphic comprising an "RL" logo. In various embodiments, a volume of cationic treatment agent may be applied at the cationic garment area 521 which may correspond to the pattern element shape of the pattern element 521. As a non-limiting example, the second garment pattern 520 may comprise a logo or any other image, which may be associated with an enterprise such as, for example, a business, institution, organization, and/or the like.

ii. Second Exemplary Operation

A garment comprising one or more pre-treated cationized garment areas may be dyed such that the one or more pre-treated cationized garment areas interact with a volume of dyestuff to create the one or more pattern elements of the garment pattern.

Figure 6B:
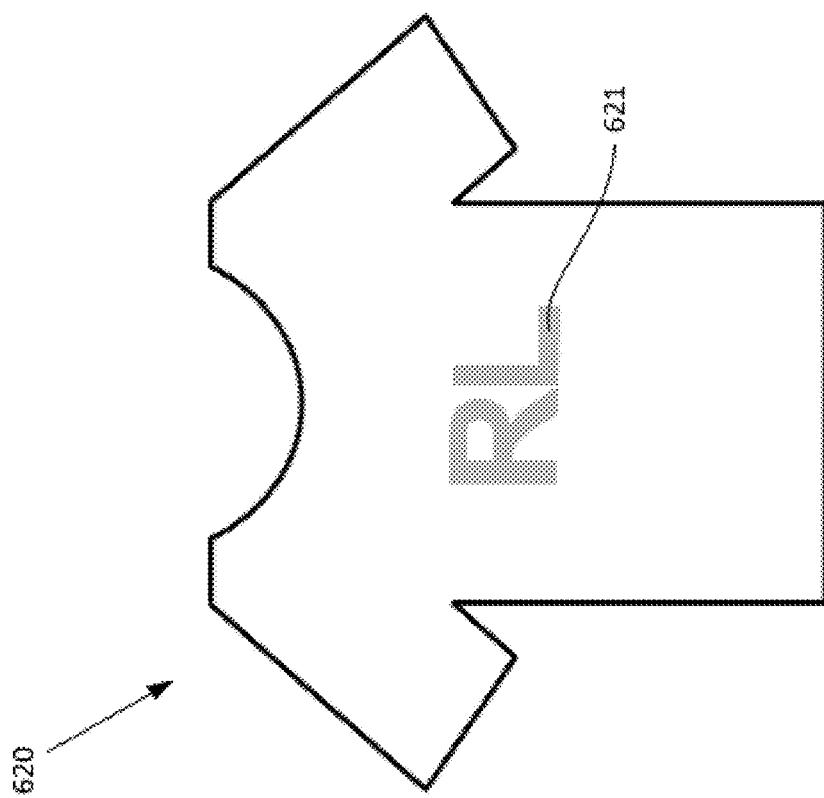
FIGS. 6a-6b illustrate an exemplary garment dyed in accordance with some example embodiments described herein.
Figure 6A:
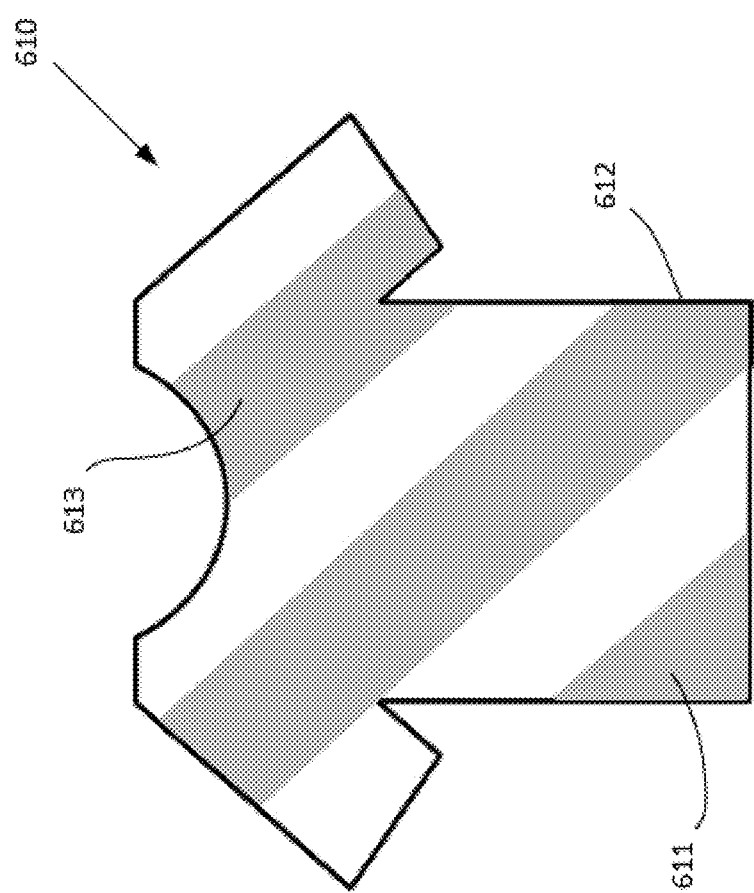

As illustrated in FIG. 6A, the first garment pattern 610 corresponds to the first garment pattern illustrated in FIG. 5A. As shown, the first garment pattern 610 comprises a first pattern element 611, a second pattern element 612, and a third pattern element 613. The first, second, and third pattern elements 611, 612, 613 may comprise a first pattern element shape, a second pattern element shape, and a third pattern element shape, respectively, which may correspond to the first cationized garment area 511, the second cationized garment area 512, and the third cationized garment area 513, as illustrated in FIG. 5A. As described herein, during a dyeing operation, the first, second, and third pattern elements 611, 612, 613 may each absorb a volume of dyestuff. In various embodiments, due at least in part to the cationization of the garment areas corresponding to the first, second, and third pattern element shapes, at least substantially all of a volume of dyestuff absorbed by the garment during a dyeing operation is absorbed by the first, second, and third pattern elements 611, 612, 613, collectively, while the untreated garment areas maintain the original garment color. Based on user input, the volume of dyestuff utilized during the dyeing operation may be configured to produce a pattern element comprising a particular pattern element color. Each of the pattern elements 611, 612, 613 comprise the particular pattern element color corresponding to the volume of dyestuff utilized during the dyeing operation.

As described herein, the extent to which a pattern element absorbs a volume of dyestuff, and thus, the pattern element depth of shade of the pattern element, may be affected by three depth of shade input variables: the volume of dyestuff used in a dye cycle, the dye cycle runtime, and the concentration of cationic treatment agent applied at the garment area ("cationic concentration"). In various embodiments, a cationic concentration of 100% should be understood to be the minimum cationic concentration required to achieve a full pattern element depth of color. In various embodiments, a dyestuff volume of 100% should be understood to be the maximum amount of dyestuff an area particular garment area is physically capable of absorbing under a given set of dye cycle operating conditions, assuming a cationic concentration of 100%, as described herein. Further, in various embodiments, a dye cycle runtime of 100% should be understood to be the minimum amount of time it would take to achieve a full pattern element depth of color given a cationic concentration of 100% and a dyestuff volume of 100% under a given set of dye cycle operating conditions. For example, as illustrated in FIG. 6A the first pattern element 611, the second pattern element, 612, and the third pattern element 613 may each comprise a depth of shade of approximately 100%. In one exemplary embodiment, the dye cycle runtime and the dyestuff volume, as described herein, may each be 100% and the pattern elements 611, 612, and 613 may each comprise a cationic concentration of 100%.

In various embodiments, as described herein, one or more of the aforementioned depth of shade input variables may be selectively varied, alone or in combination, to achieve a desired pattern element depth of shade. For example, using the exemplary pattern elements illustrated in in FIG. 6A, the first pattern element 611, the second pattern element, 612, and the third pattern element 613 may each comprise a depth of shade of approximately 50%. In an exemplary embodiment, each pattern element 611, 612, and 613 may comprise a cationic concentration of 50%. That is, the volume of cationic treatment agent applied to each of the cationized garment areas corresponding to the first, second, and third pattern element shapes is 50% of the theoretical volume of cationic treatment agent that would allow for the garment areas to absorb a maximum volume of dyestuff. The selectively reduced cationic concentration of 50% chemically creates an absorption threshold for each of the pattern elements 611, 612, and 613 that is 50% less than the garment is physically capable of absorbing. Accordingly, despite a dye cycle runtime and a volume of dyestuff utilized in the dyeing operation that would typically be sufficient to produce a full depth of shade, the pattern element depth of shade of each of the pattern elements 611, 612, 613 may only rise to be 50% of the full depth of shade. In various embodiments, the respective cationic concentrations of the first, second, and third pattern elements may vary from one another. In such a circumstance, the pattern element depth of shade of at least one of the pattern elements may be different from that of at least one of the other pattern elements of the garment pattern.

As illustrated in FIG. 6B, a second garment pattern 620 corresponds to the exemplary garment pattern illustrated in FIG. 5B. As shown, the second garment pattern 620 comprises a pattern element 621, which comprises a pattern element shape corresponding to the cationized garment area 521, as illustrated in FIG. 5B. As described herein, due at least in part to the cationization of the garment area corresponding to the pattern element shapes, at least substantially all of a volume of dyestuff absorbed by the garment during a dyeing operation is absorbed by the pattern element 621, while the untreated garment areas maintain the original garment color. Based on user input, the volume of dyestuff utilized during the dyeing operation may be configured to produce a pattern element comprising a particular pattern element color. The pattern element 621 may comprise the particular pattern element color corresponding to the volume of dyestuff utilized during the dyeing operation. As illustrated in FIG. 6B, pattern element 621 may comprise a pattern element depth of shade of approximately 100%. In one exemplary embodiment, the dye cycle runtime and the dyestuff volume, as described herein, may each be 100% and the pattern element 621 may comprise a cationic concentration of 100%.

In various embodiments, as described herein, one or more of the aforementioned depth of shade input variables may be selectively varied, alone or in combination, to achieve a desired pattern element depth of shade. For example, using the exemplary pattern element illustrated in in FIG. 6B, the cycle runtime may be selectively reduced to 50%, while the dyestuff volume and the cationic concentration of the pattern element 621 may each be 100%. In such an exemplary circumstance, the dye cycle runtime may be half the amount of time it would take to achieve a full pattern element depth of color under a given set of dye cycle operating conditions. As described herein, the pattern element depth of shade of pattern element 621 will be less than 100% (e.g., 50%), causing the pattern element 621 to appear fainter than it would under similar circumstances with a dye cycle runtime of 100%.

As a further non-limiting example, once again using the exemplary pattern element illustrated in in FIG. 6B, the depth of shade of pattern element 621 may be reduced by selectively reducing the dyestuff volume to 50%, as described herein, while the dye cycle runtime and the cationic concentration of the pattern element 621 are each maintained at 100%. In such an exemplary circumstance, the dyestuff volume utilized in the dyeing operation may be half the volume that it would take to achieve a full pattern element depth of color, under a given set of dye cycle operating conditions. As a result, the pattern element depth of shade of pattern element 621 will be less than 100% (e.g., 50%), causing the pattern element 621 to appear fainter than it would under similar circumstances with a dyestuff volume of 100%.

iii. Third Exemplary Operation

Figure 7B:
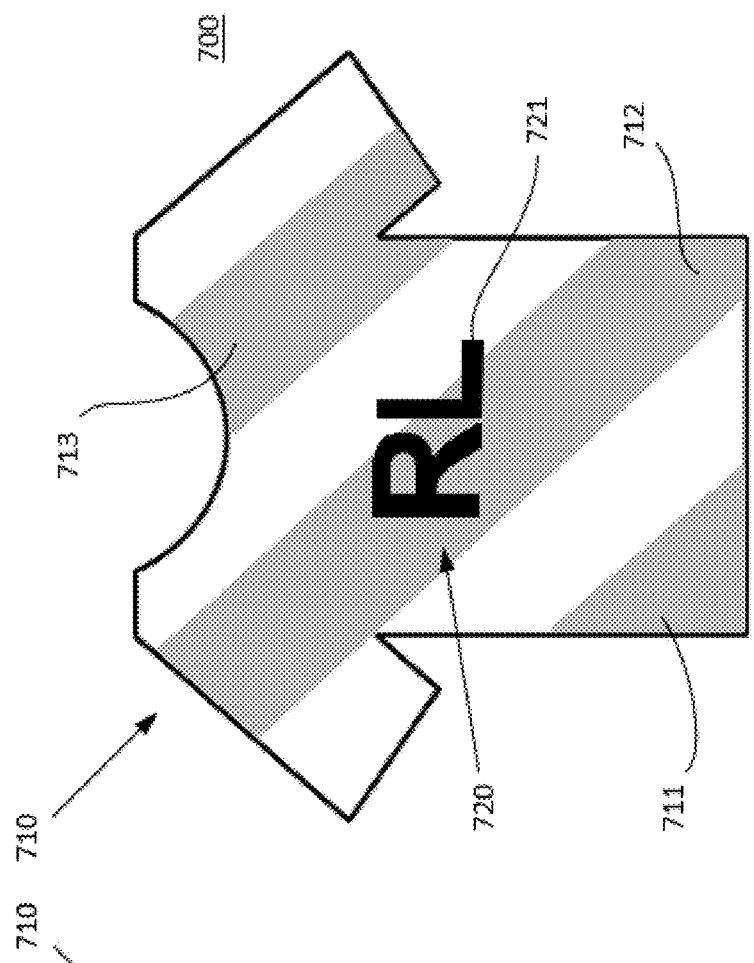
FIGS. 7a-7b illustrate an exemplary garment dyed in accordance with some example embodiments described herein.
Figure 7A:
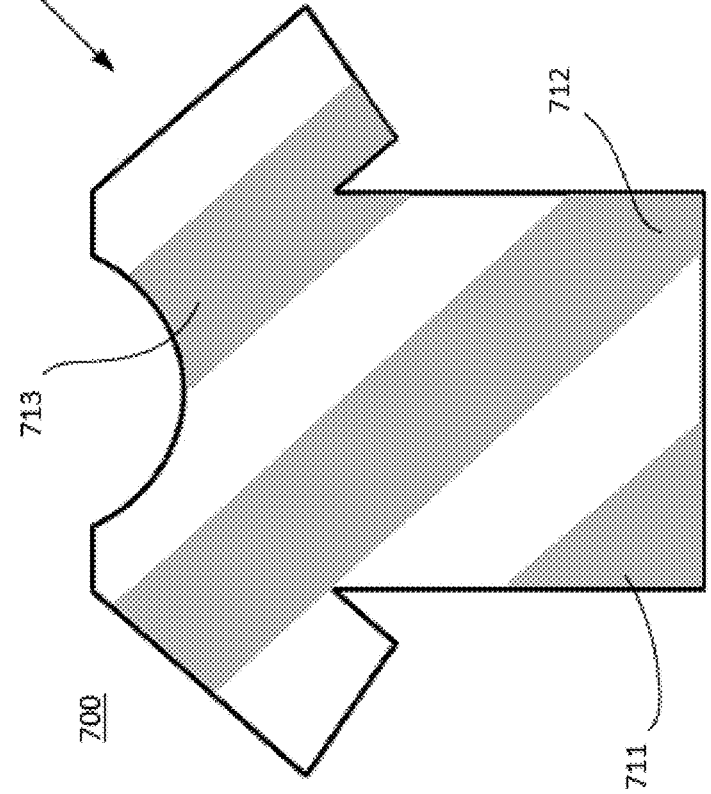

As illustrated in FIGS. 7A, the garment pattern 700 corresponds to the first garment pattern illustrated in FIG. 5A. In various embodiments, garment pattern 700 may comprise a first set of pattern elements 710. As shown, the first set of pattern elements 710 comprises a first pattern element 711, a second pattern element 712, and a third pattern element 713. The first, second, and third pattern elements 711, 712, 713 may comprise a first pattern element shape, a second pattern element shape, and a third pattern element shape, respectively, which may correspond to the first cationized garment area 511, the second cationized garment area 512, and the third cationized garment area 513, as illustrated in FIG. 5A. As described herein, during a first dyeing operation, the first, second, and third pattern elements 711, 712, 713 may each absorb a volume of dyestuff. In various embodiments, due at least in part to the cationization of the garment areas corresponding to the first second, and third pattern element shapes, at least substantially all of a volume of dyestuff absorbed by the garment during a dyeing operation is absorbed by the first, second, and third pattern elements 711, 712, 713, collectively, while the untreated garment areas maintain the original garment color.

In various embodiments, the garment may be dyed until at least substantially all of the applied cationic treatment agent has been neutralized by an exhausted volume of dyestuff, as described herein. In such a circumstance, a garment may undergo a second dyeing operation, which may comprise applying a second cationic treatment agent layer to the patterned garment, injecting a volume of one or more concentrated liquid dyes—each comprising a volume of dyestuff—and dyeing the patterned garment until at least substantially all of the second cationic treatment agent layer has been neutralized by an exhausted volume of dyestuff. In various embodiments, the volume of dyestuff utilized in the second dyeing operation may correspond to a secondary pattern element color, which may comprise the pattern element color of a second set of pattern elements. As illustrated in FIG. 7B, the garment pattern 700 may further comprise a second set of pattern elements 720. As shown, the second set of pattern elements 720 comprises a pattern element 721, which comprises a pattern element shape corresponding to the cationized garment area 521, as illustrated in FIG. 5B. As described herein, due at least in part to the cationization of the garment area corresponding to the pattern element shape of pattern element 721, at least substantially all of a volume of dyestuff absorbed by the garment during a second dyeing operation is absorbed by the pattern element 721. The pattern element 721 may comprise the particular pattern element color corresponding to the volume of dyestuff utilized during the second dyeing operation. As shown in FIG. 7B, the first set of pattern elements 710 and the second set of pattern elements 720 may comprise different pattern element colors, such that the garment pattern 700 may be a multi-colored pattern. In various embodiments, the pattern element size, pattern element color, and/or and pattern element depth of shade of each of the pattern elements of the garment pattern 700 may be selected by a user and/or selectively modified as described herein.

Figure 8:
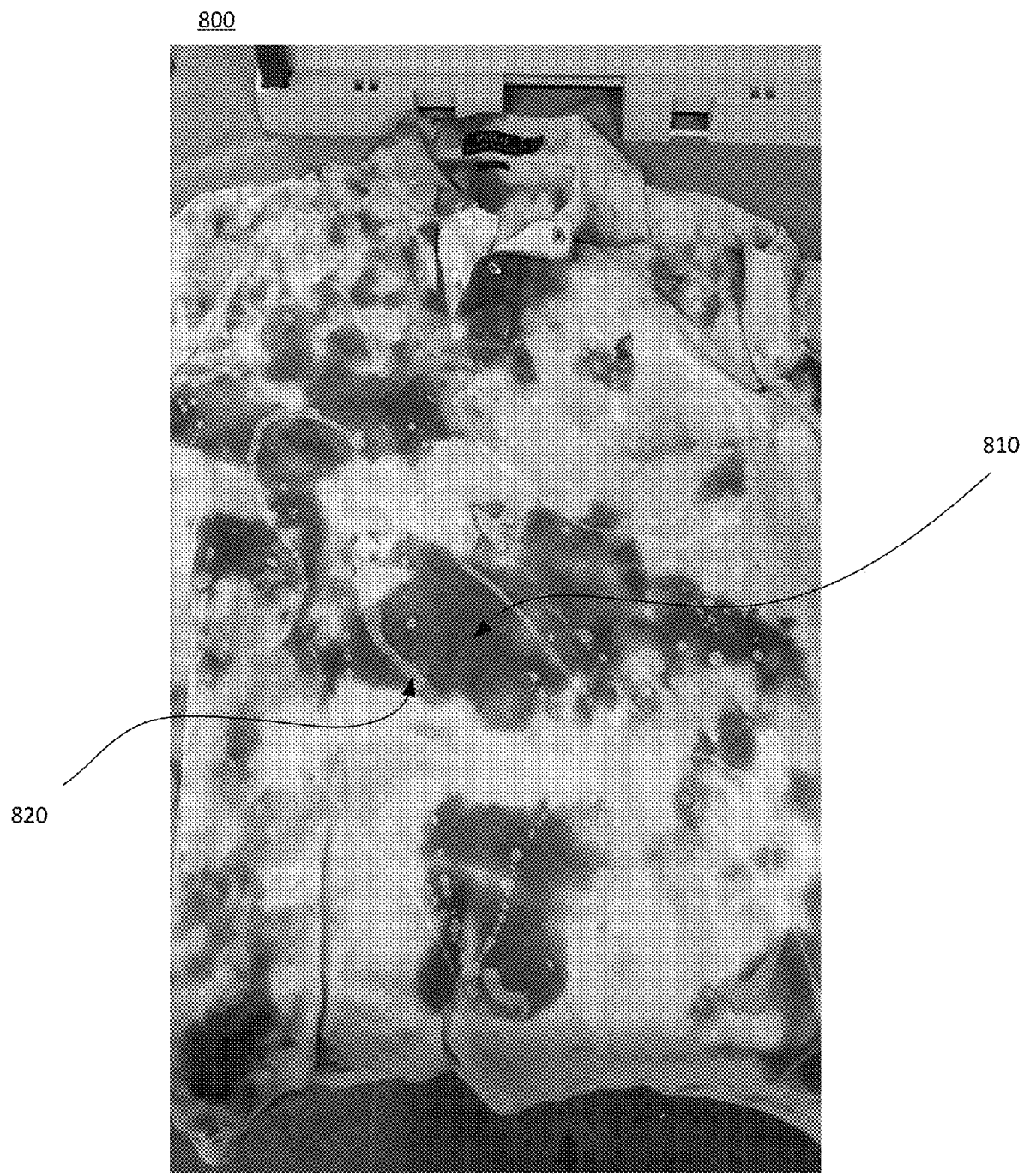
FIG. 8 shows an experimental exemplary garment dyed in accordance with some example embodiments described herein.

As a further example, FIG. 8 shows an experimental garment comprising garment pattern 800. As shown, garment pattern 800 comprises both a first set of pattern elements 810 and a second set of pattern elements 820. Both the first and the second sets of pattern elements comprise a plurality of pattern elements, each of which comprises a respective pattern element shape, pattern element color, and pattern element depth of shade.

Garment pattern 800 was produced by first selectively applying various volumes of cationic treatment agent to various garment areas via a hand-spraying application method (the garment areas corresponding to the first set of pattern elements 810). The exemplary garment was then cured and subsequently exposed to a first dyeing operation, wherein a volume of dyestuff corresponding to a red garment output color was injected into a dyeing machine via a volume of concentrated liquid dye. The first dyeing operation was executed until at least substantially all of the applied cationic treatment agent had been neutralized by an exhausted volume of dyestuff, as described herein, so as to produce a garment pattern comprising the first set of pattern elements 810. As shown in FIG. 8, each of the pattern elements of the first set of pattern elements 810 comprises a red pattern element color, with the respective depth of shade of each of the pattern elements the varying based on the cationic concentration of the garment area corresponding to the pattern element shape of each pattern element.

The second set of pattern elements 820 was subsequently added at to the garment pattern 800 via a second dyeing operation. Once again, various volumes of cationic treatment agent were selectively applied—on top of the first set of pattern elements—to various garment areas (corresponding to the second set of pattern elements 820) via a hand-spraying application method. The exemplary garment was then cured and subsequently exposed to a second dyeing operation, wherein a volume of dyestuff corresponding to a yellow garment output color was injected into a dyeing machine at least partially filled with a substantially clean solvent. The second dyeing operation was executed until at least substantially all of the cationic treatment agent applied on top of the first set of pattern elements had been neutralized by an exhausted volume of dyestuff, as described herein. As shown, the repetition of the dyeing operations using different dyestuff corresponding to different garment output colors enables the garment pattern 800 to be configured as a multi-colored garment pattern comprising both the first set of pattern elements 810 and the second set of pattern elements 820.

iv. Fourth Exemplary Operation

Figure 9:
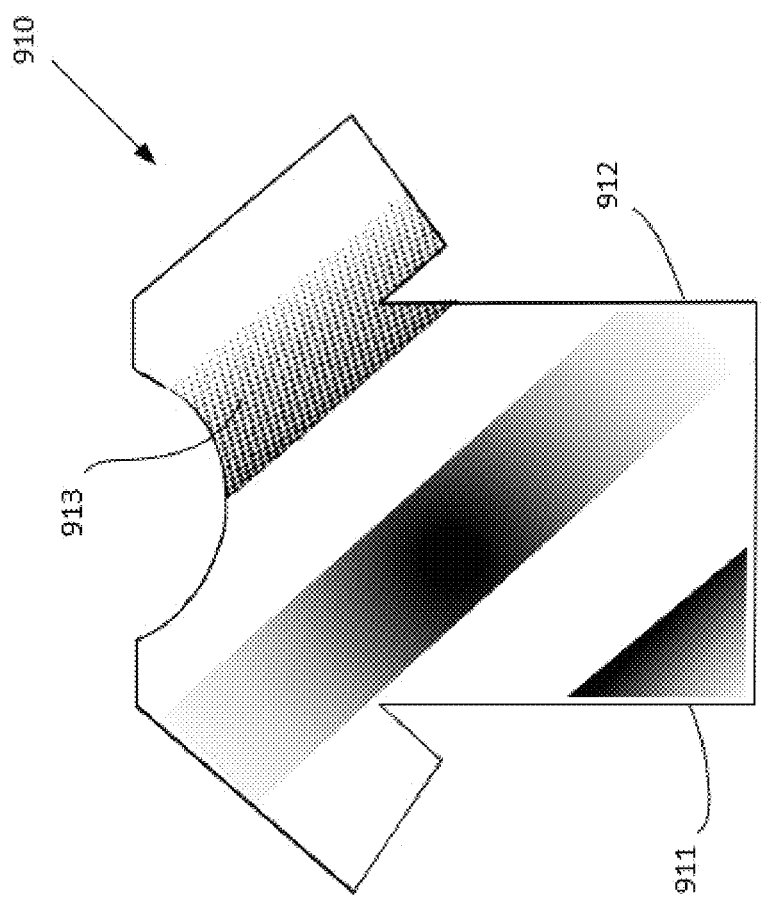
FIG. 9 illustrates an exemplary garment dyed in accordance with some example embodiments described herein.

As illustrated in FIG. 9, the first garment pattern 910 corresponds to the first garment pattern illustrated in FIG. 5A. As shown, the first garment pattern 910 comprises a first pattern element 911, a second pattern element 912, and a third pattern element 913. The first, second, and third pattern elements 911, 912, 913 may comprise a first pattern element shape, a second pattern element shape, and a third pattern element shape, respectively, which may correspond to the first cationized garment area 511, the second cationized garment area 512, and the third cationized garment area 513, as illustrated in FIG. 5A. As discussed herein, the cationic treatment agent may be selectively applied to the garment using various application apparatuses and methods. For example, as illustrated in FIG. 10, the first pattern element 911 and the second pattern element 912 may each correspond to a cationized garment area to which a volume of cationic treatment agent was applied using a manual spraying process, such as, for example, hand spraying. Further, as illustrated, the third pattern element 913 may correspond to a cationized garment area to which a volume of cationic treatment agent was applied using an automatic spraying process, such as, for example, using an ink jet printer. In such a circumstance, the volume of cationic treatment agent may be applied to a garment area as an array of substantially small localized concentrations, which, when subjected to s subsequent dyeing process, may collectively correspond a pattern element. In various embodiments, each volume of cationic treatment agent applied to the one or more cationized garment areas may be applied using either the same or different application apparatuses and/or methods, as described herein.

As described herein, during a dyeing operation, the first, second, and third pattern elements 911, 912, 913 may each absorb a volume of dyestuff. In various embodiments, due at least in part to the cationization of the garment areas corresponding to the first second, and third pattern element shapes, at least substantially all of a volume of dyestuff absorbed by the garment during a dyeing operation is absorbed by the first, second, and third pattern elements 911, 912, 913, collectively, while the untreated garment areas maintain the original garment color. Based on user input, the volume of dyestuff utilized during the dyeing operation may be configured to produce a pattern element comprising a particular pattern element color. Each of the pattern elements 911, 912, 913 comprise the particular pattern element color corresponding to the volume of dyestuff utilized during the dyeing operation.

As illustrated in FIG. 9, the first pattern element 911, the second pattern element, 912, and the third pattern element 913 may each comprise a gradient depth of shade wherein the respective depth of shade percentages progressively decrease across at least a portion of each pattern element. In one exemplary embodiment, the dye cycle runtime and the dyestuff volume, as described herein, may each be 100% and the pattern elements 911, 912, and 913 may each comprise a gradient cationic concentration. As shown, the first and third pattern elements 911, 913 each comprise a linearly gradient depth of shade, while the second pattern element 912 comprises a radially gradient depth of shade. As discussed herein, a pattern element depth of shade which gradually transitions from a fuller depth of shade to a lesser depth of shade in a first direction across a portion of the pattern element may correspond to a gradient cationic concentration which progressively decreases in the first direction across the garment area corresponding to the pattern element. Such a gradient pattern element depth of shade may be desirable to avoid distinct depth of shade variances. It should be understood that a pattern element may comprise a gradient depth of shade of any shape, intensity, and/or directional configuration.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for dyeing a patterned dye-absorbent material, the method comprising:
    receiving a dye-absorbent material pattern instruction corresponding to a dye-absorbent material pattern, wherein the dye-absorbent material pattern comprises one or more pattern elements, each of the one or more pattern elements being defined by a pattern element shape, pattern element color, and pattern element depth of shade;
    applying a volume of cationic treatment agent at one or more localized dye-absorbent material areas of a dye-absorbent material corresponding to a respective pattern element shape of each of the one or more pattern elements;
    curing the volume of cationic treatment agent at each of the one or more pattern elements; and
    dyeing, via a dyeing machine, the dye-absorbent material until substantially all of the cationic treatment agent applied to the dye-absorbent material has been neutralized by an amount of dyestuff present within a volume of concentrated liquid dye dispensed into the dyeing machine.

2. The method of claim 1, further comprising determining the volume of cationic treatment agent to be applied at the one or more localized dye-absorbent material areas corresponding to each of the one or more pattern elements of the dye-absorbent material pattern based on a respective pattern element color, a respective pattern element depth of shade, and the respective pattern element shape of each of the one or more pattern elements.

3. The method of claim 1, wherein applying the volume of cationic treatment agent at the one or more localized dye-absorbent material areas of the dye-absorbent material comprises executing an application operation using an application means comprising one or more of a screen printing means, a manual spraying means, and an automated spraying means.

4. The method of claim 1, further comprising mixing one or more volumes of dyestuff with one or more volumes of solvent to form one or more concentrated liquid dyes.

5. The method of claim 1, further comprising determining, via a processor, a volume of one or more concentrated liquid dyes of a dye injection system to be injected into a dyeing machine in order to produce the dye-absorbent material pattern with at least one pattern element having a user-selected desired pattern element color on the dye-absorbent material.

6. The method of claim 5, further comprising, based at least in part on a user-selected desired pattern element color, causing one or more of a plurality of concentrated liquid dye cartridges to dispense the volume of concentrated liquid dye into the dyeing machine to produce the at least one pattern element having the user-selected desired pattern element color on the dye-absorbent material.

7. The method of claim 6, further comprising, based at least in part on the user-selected desired pattern element color, causing a first concentrated liquid dye cartridge of the plurality of concentrated liquid dye cartridges to dispense the volume of concentrated liquid dye into the dyeing machine and a second concentrated liquid dye cartridge of the plurality of concentrated liquid dye cartridges to dispense a second volume of concentrated liquid dye into the dyeing machine produce the at least one pattern element having the user-selected desired pattern element color on the dye-absorbent material.

8. The method of claim 1, further comprising determining the volume of concentrated liquid dye dispensed into the dyeing machine by calculating a minimum volume of concentrated liquid dye required to neutralize substantially all of the volume of cationic treatment agent applied to the dye-absorbent material.

9. The method of claim 1, wherein the one or more pattern elements comprises a first pattern element and a second pattern element; and wherein applying the volume of cationic treatment agent at the one or more localized dye-absorbent material areas comprises applying a first volume of cationic treatment agent at a first localized dye-absorbent material area corresponding to a first pattern element shape of the first pattern element, and applying a second volume of cationic treatment agent at a second localized dye-absorbent material area corresponding to a second pattern element shape of the second pattern element, wherein the first volume of cationic treatment agent is greater than the second volume of cationic treatment agent.

10. The method of claim 1, further comprising:
upon completing a first dyeing operation such that the dye-absorbent material defines a patterned material exhibiting at least the dye-absorbent material pattern, dispensing a resultant dyebath containing a resultant volume of dyestuff; and
executing a second cationic pretreatment of the dye-absorbent material defining the patterned material using a second volume of cationic treatment agent configured to enable dyeing of a second dye-absorbent material pattern onto the dye-absorbent material.

11. The method of claim 10, further comprising:
executing, via the dyeing machine, a second dyeing operation associated with the dye-absorbent material defining the patterned material such that each of the dye-absorbent material pattern and the second dye-absorbent material pattern are dyed onto the dye-absorbent material;
wherein executing, via the dyeing machine, the first dyeing operation and the second dyeing operation comprises maintaining at least a portion of a volume of solvent used in the first dyeing operation within a substantially closed-loop system for reuse in the second dyeing operation.

12. The method of claim 10, further comprising:
receiving a second dye-absorbent material pattern instruction corresponding to the second dye-absorbent material pattern, wherein the second dye-absorbent material pattern comprises one or more secondary pattern elements, each of the one or more secondary pattern elements being defined by a secondary pattern element shape, secondary pattern element color, and secondary pattern element depth of shade; and
dyeing, via the dyeing machine, the dye-absorbent material until substantially all of the second volume of cationic treatment agent applied to the dye-absorbent material has been neutralized by a second amount of dyestuff present within a second volume of liquid dye dispensed into the dyeing machine after the first dyeing operation;
wherein executing the second cationic pretreatment of the dye-absorbent material comprises:
applying the second volume of cationic treatment agent at one or more secondary localized dye-absorbent material areas of the dye-absorbent material, each secondary localized dye-absorbent material area corresponding to a respective secondary pattern element shape of each of the one or more secondary pattern elements; and
curing the second volume of cationic treatment agent at each of the one or more secondary pattern elements.

13. The method of claim 12, wherein at least a portion of the one or more pattern elements of the dye-absorbent material pattern is defined by a first pattern element color and at least a portion of the one or more secondary pattern elements of the second dye-absorbent material pattern is defined by a second pattern element color, wherein the first pattern element color and the second pattern element color are different colors.

14. The method of claim 1, wherein the dye-absorbent material pattern instruction corresponds to the dye-absorbent material pattern, the dye-absorbent material pattern comprising a first pattern element and a second pattern element, wherein the first pattern element is defined by a first pattern element shape, a first pattern element color, and a first pattern element depth, wherein the second pattern element is defined by a second pattern element shape, a second pattern element color, and a second pattern element depth, and wherein the first pattern element shape is different than the second pattern element shape, the first pattern element color is different than the second pattern element color, and the first pattern element depth of shade is different than the second pattern element depth of shade.

15. The method of claim 1, wherein receiving the dye-absorbent material pattern instruction corresponding to the dye-absorbent material pattern comprises receiving a user input at a user interface associated with the dyeing machine, the user input comprising a user selection of at least one of the pattern element shape, the pattern element color, and the pattern element depth of shade of the one or more pattern elements.

16. The method of claim 1, wherein the amount of dyestuff present within the volume of liquid dye dispensed into the dyeing machine is substantially less than or equal to a dyestuff absorption capacity of the dye-absorbent material.

17. The method of claim 1, wherein dyeing, via the dyeing machine, the dye-absorbent material until substantially all of the cationic treatment agent applied to the dye-absorbent material has been neutralized by the amount of dyestuff comprises maintaining a dyebath present within the dyeing machine at substantially ambient room temperature.

18. The method of claim 17, wherein the dyebath comprises the volume of liquid dye dispensed into the dyeing machine and a volume of solvent, the volume of solvent comprising water.

* * * * *